United States Patent
Xu et al.

(10) Patent No.: US 11,109,279 B2
(45) Date of Patent: Aug. 31, 2021

(54) HANDOVER METHOD AND APPARATUS USING RADIO RESOURCE RECONFIGURATION MESSAGES

(71) Applicant: Huawei Technologies Co., Ltd., Shenzhen (CN)

(72) Inventors: Haibo Xu, Beijing (CN); Nathan Edward Tenny, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 16/493,702

(22) PCT Filed: Mar. 24, 2017

(86) PCT No.: PCT/CN2017/078209
§ 371 (c)(1),
(2) Date: Sep. 12, 2019

(87) PCT Pub. No.: WO2018/165996
PCT Pub. Date: Sep. 20, 2018

(65) Prior Publication Data
US 2020/0137637 A1   Apr. 30, 2020

(30) Foreign Application Priority Data
Mar. 13, 2017   (CN) ............ 201710147104.9

(51) Int. Cl.
*H04W 36/00* (2009.01)
*H04W 36/08* (2009.01)
(Continued)

(52) U.S. Cl.
CPC ... *H04W 36/0009* (2018.08); *H04W 36/0072* (2013.01); *H04W 36/08* (2013.01); *H04W 36/38* (2013.01); *H04W 88/04* (2013.01)

(58) Field of Classification Search
CPC ................. H04W 36/0009; H04W 76/23
See application file for complete search history.

(56) References Cited

U.S. PATENT DOCUMENTS

2013/0260811 A1   10/2013   Rayavarapu
2013/0288668 A1   10/2013   Pragada et al.
(Continued)

FOREIGN PATENT DOCUMENTS

CN   102026404 A   4/2011
CN   102123517 A   7/2011
(Continued)

*Primary Examiner* — Hoon J Chung
(74) *Attorney, Agent, or Firm* — Slater Matsil, LLP

(57) ABSTRACT

A method includes: receiving, by first UE, a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the first UE from the first network device to a second network device, the second radio resource reconfiguration message includes a second handover command, the second handover command is used to instruct to hand over second UE from the first network device to a third network device; and handing over, by the first UE, from the first network device to the second network device according to the first handover command.

20 Claims, 19 Drawing Sheets

(51) Int. Cl.
*H04W 36/38* (2009.01)
*H04W 88/04* (2009.01)

(56) References Cited

U.S. PATENT DOCUMENTS

| | | | |
|---|---|---|---|
| 2015/0049734 A1* | 2/2015 | Park et al. | ........ H04W 36/0005 |
| 2017/0086252 A1 | 3/2017 | Chai et al. | |
| 2018/0014238 A1* | 1/2018 | Lee et al. | ............... H04W 36/30 |
| 2018/0227821 A1* | 8/2018 | Tsai et al. | ............. H04W 36/30 |

FOREIGN PATENT DOCUMENTS

| | | |
|---|---|---|
| CN | 102202405 A | 9/2011 |
| CN | 103037450 A | 4/2013 |
| CN | 103582035 A | 2/2014 |
| CN | 104272707 A | 1/2015 |
| CN | 106162777 A | 11/2016 |
| CN | 106465264 A | 2/2017 |
| CN | 106488424 A | 3/2017 |
| EP | 2530972 A1 | 12/2012 |
| EP | 2645803 A1 | 10/2013 |
| EP | 2928263 A1 | 10/2015 |
| EP | 3506674 A1 | 7/2019 |
| WO | 2013191505 A1 | 12/2013 |
| WO | 2016136171 A1 | 9/2016 |
| WO | WO-2017119919 A1 * | 7/2017 ............ H04W 8/005 |

* cited by examiner

400

First UE receives a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the first UE from the first network device to a second network device, the second radio resource reconfiguration message includes a second handover command, the second handover command is used to instruct to hand over second UE from the first network device to a third network device, M is a quantity of second UEs in an RRC connected mode that are connected to the first UE, M is an integer greater than or equal to 1, and the second network device is the same as or different from the third network device

— 410

Hand over the first UE from the first network device to the second network device according to the first handover command

HANDOVER METHOD AND APPARATUS USING RADIO RESOURCE RECONFIGURATION MESSAGES

CROSS-REFERENCE TO RELATED APPLICATIONS

This application is a national stage of International Application No. PCT/CN2017/078209, filed Mar. 24, 2017, which claims priority to Chinese Patent Application No. 201710147104.9, filed on Mar. 13, 2017. Both of the aforementioned applications are hereby incorporated by reference in their entireties.

TECHNICAL FIELD

Embodiments of the present invention relate to the communications field, and in particular, to a handover method and apparatus.

BACKGROUND

Two connection modes may exist between user equipment (User Equipment, UE) and a network device. In a first connection mode, the UE is directly connected to the network device to perform data communication. This is a direct communication mode. In a second connection mode, first UE is connected to the network device by using second UE, to perform data communication. This is an indirect communication mode. In this case, the first UE may be referred to as remote UE, and the second UE may be referred to as relay UE.

In Rel-13 in a long term evolution (Long Term Evolution, LTE) system, the 3rd generation partnership project (3rd Generation Partnership Project, 3GPP) studies and standardizes a function of relay UE. In Rel-13, the relay UE forwards communication data between remote UE and a network device through an IP layer (layer 3).

However, when the communication data between the remote UE and the network device is forwarded through the Internet protocol (Internet Protocol, IP) layer of the relay UE, the following problems arise. A first problem is about data security. A packet data convergence protocol (Packet Data Convergence Protocol, PDCP) layer of the relay UE can obtain data of the remote UE through decompression, and therefore security of the data of the remote UE cannot be ensured on the relay UE. A second problem is about service continuity. When the remote UE switches a path, service continuity cannot be ensured. A third problem is that the network device cannot differentiate between data of the remote UE and data of the relay UE.

To resolve the foregoing problems, the relay UE may forward data by using a layer 2. The layer 2 is a layer above a radio link control (Radio Link Control, RLC) layer and below the PDCP layer. This is also a current research topic in LTE Rel-15. In this case, the remote UE may be referred to as evolved remote UE, and the relay UE may be referred to as evolved relay UE (or referred to as an evolved UE-to-network relay).

When being connected to the network device by using the evolved relay UE, the evolved remote UE moves together with the evolved relay UE. When the evolved remote UE and the evolved relay UE move from one cell to another cell, inter-cell handover needs to be performed at the same time.

FIG. 1 is a schematic flowchart showing that evolved remote UE and evolved relay UE are handed over from a source base station to a target base station in the prior art. The evolved remote UE needs to be first disconnected from the evolved relay UE, to be specific, switches a path from a trunk link to a cellular link, and then performs an inter-cell handover process. After handover is completed, the evolved remote UE performs a process of path switching from the cellular link to the trunk link again.

In the foregoing process, the evolved remote UE needs to perform two path switching processes and one handover process, resulting in high signaling overheads, and high power consumption in the handover process.

SUMMARY

Embodiments of the present invention provide a handover method and apparatus, to resolve a problem of high signaling overheads and high power consumption when evolved remote UE and evolved relay UE are handed over.

According to a first aspect, a handover method is provided, including: receiving, by first UE, a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the first UE from the first network device to a second network device, the second radio resource reconfiguration message includes a second handover command, the second handover command is used to instruct to hand over second UE from the first network device to a third network device, M is a quantity of second UEs in an RRC connected mode that are connected to the first UE, M is an integer greater than or equal to 1, and the second network device is the same as or different from the third network device; and handing over, by the first UE, from the first network device to the second network device according to the first handover command. In this way, the first UE is handed over by receiving the first radio resource reconfiguration message and the second radio resource reconfiguration messages. Compared with a case in which the first UE and the second UE respectively receive the first radio resource reconfiguration message and the second radio resource reconfiguration message, this application reduces signaling overheads and power consumption.

In a possible implementation, the first radio resource reconfiguration message includes first information, and the first information includes at least one of first indication information and second indication information, where the first indication information is used to indicate second UE connected to the second network device by using the first UE after the first UE is handed over to the second network device, a quantity of second UEs connected to the second network device by using the first UE is X, and X is an integer that is not greater than M; and the second indication information is used to indicate second UE that is connected to the second network device not by using the first UE after the first UE is handed over to the second network device, and a quantity of second UEs that are connected to the second network device not by using the first UE is M-X.

In a possible implementation, the first indication information or the second indication information is specifically a device identifier of the second UE.

In a possible implementation, the first radio resource reconfiguration message includes second information, and the second information includes a configuration of a resource or a resource pool used to send the second radio resource configuration message over a sidelink.

In a possible implementation, the first radio resource reconfiguration message is included in a first RLC SDU, the second radio resource reconfiguration messages are included in second RLC SDUs, and the first RLC SDU and at least one of the M second RLC SDUs are included in one RLC PDU.

In a possible implementation, before the handing over, by the first UE, from the first network device to the second network device according to the first handover command, the method further includes: sending, by the first UE, the second radio resource reconfiguration message to the second UE; and handing over, by the first UE, from the first network device to the second network device after the first UE completes sending the M second radio resource reconfiguration messages.

In a possible implementation, before the handing over, by the first UE, from the first network device to the second network device according to the first handover command, the method further includes: sending, by the first UE, the second radio resource reconfiguration message to the second UE; receiving, by the first UE, indication information that is fed back by the second UE and that indicates that the second radio resource reconfiguration message is successfully received; and handing over, by the first UE, from the first network device to the second network device after the first UE receives M pieces of indication information.

In a possible implementation, after the sending, by the first UE, the second radio resource reconfiguration message to the second UE, or after the receiving, by the first UE, indication information that is fed back by the second UE and that indicates that the second radio resource reconfiguration message is successfully received, the method further includes: suspending, by the first UE, transmission and reception of data on a radio bearer over a link between the first UE and the second UE. In this way, information overheads and power consumption of the second UE are reduced.

In a possible implementation, the method further includes: when handing over, by the first UE, from the first network device to the second network device according to the first handover command, if there is second UE connected to the second network device by using the first UE, re-establishing, by the first UE, a radio bearer over a link between the first UE and the second UE.

In a possible implementation, the method further includes: when handing over, by the first UE, from the first network device to the second network device according to the first handover command, if there is no second UE connected to the second network device by using the first UE, releasing, by the first UE, the radio bearer over the link between the first UE and the second UE.

In a possible implementation, after the handing over, by the first UE, from the first network device to the second network device according to the first handover command, the method further includes: if there is the second UE connected to the second network device by using the first UE, resuming, by the first UE, transmission and reception of data on the radio bearer over the link between the first UE and the second UE; and sending, by the first UE, a first message to the second UE, where the first message is used to instruct the second UE to resume transmission and reception of the data on the radio bearer over the link between the second UE and the first UE.

In a possible implementation, after the handing over, by the first UE, from the first network device to the second network device, the method further includes: if there is no second UE connected to the second network device by using the first UE, sending, by the first UE, the second radio resource reconfiguration message to the second UE.

In a possible implementation, the method further includes: if there is no second UE connected to the second network device by using the first UE, sending, by the first UE, a second message to the second UE before the first UE is handed over from the first network device to the second network device, where the second message is used to instruct the second UE to suspend transmission and reception of data on a radio bearer over a link between the second UE and the first UE; suspending, by the first UE, transmission and reception of the data on the radio bearer over the link between the first UE and the second UE; sending, by the first UE, the second message to the second UE after the first UE is handed over from the first network device to the second network device, where the second message is used to instruct the second UE to resume transmission and reception of the data on the radio bearer over the link between the second UE and the first UE; resuming, by the first UE, transmission and reception of the data on the radio bearer over the link between the first UE and the first UE; and sending, by the first UE, the second radio resource reconfiguration message to the second UE.

In a possible implementation, after the sending, by the first UE, the second radio resource reconfiguration message to the second UE, the method further includes: if there is no second UE connected to the second network device by using the first UE, releasing, by the first UE, a connection of the link between the first UE and the second UE.

In a possible implementation, after the handing over, by the first UE, from the first network device to the second network device, the method further includes: if there is second UE connected to the second network device by using the first UE, sending, by the first UE, the second radio resource reconfiguration message to the second UE; and re-establishing, by the first UE, a radio bearer over a link between the first UE and the second UE.

In a possible implementation, the method further includes: if there is second UE connected to the second network device by using the first UE, sending, by the first UE, a second message to the second UE before the first UE is handed over from the first network device to the second network device, where the second message is used to instruct the second UE to suspend transmission and reception of data on a radio bearer over a link between the second UE and the first UE; suspending, by the first UE, transmission and reception of the data on the radio bearer over the link between the first UE and the second UE; sending, by the first UE, a third message to the second UE after the first UE is handed over from the first network device to the second network device, where the third message is used to instruct the second UE to resume transmission and reception of the data on the radio bearer over the link between the second UE and the first UE; resuming, by the first UE, transmission and reception of the data on the radio bearer over the link between the first UE and the first UE; sending, by the first UE, the second radio resource reconfiguration message to the second UE; and re-establishing, by the first UE, a radio bearer over the link between the first UE and the second UE.

According to a second aspect, a handover apparatus is provided, and the apparatus includes a receiver and a processor, where the receiver is configured to receive a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the handover apparatus from the first network device to a second network device, the second radio resource reconfiguration message includes a second handover command, the second handover command is used to instruct to hand over second UE from the first network device to a third network device, M is a quantity of second UEs in an RRC connected mode that are connected to the handover apparatus, M is an integer greater than or equal to 1, and the second network device is the same as or different from the third network device; and the processor is configured to hand over the handover apparatus from the first network device to the second network device according to the first handover command. In this way, the first UE is handed over by receiving the first radio resource reconfiguration message and the second radio resource reconfiguration messages. Compared with a case in which the first UE and the second UE respectively receive the first radio resource reconfiguration message and the second radio resource reconfiguration message, this application reduces signaling overheads.

In a possible implementation, the first radio resource reconfiguration message includes first information, and the first information includes at least one of first indication information and second indication information, where the first indication information is used to indicate second UE connected to the second network device by using the handover apparatus after the handover apparatus is handed over to the second network device, a quantity of second UEs connected to the second network device by using the handover apparatus is X, and X is an integer that is not greater than M; and the second indication information is used to indicate second UE that is connected to the second network device not by using the handover apparatus after the handover apparatus is handed over to the second network device, and a quantity of second UEs that are connected to the second network device not by using the handover apparatus is M-X.

In a possible implementation, the first indication information or the second indication information is specifically a device identifier of the second UE.

In a possible implementation, the first radio resource reconfiguration message includes second information, and the second information includes a configuration of a resource or a resource pool used to send the second radio resource configuration message over a sidelink.

In a possible implementation, the first radio resource reconfiguration message is included in a first RLC SDU, the second radio resource reconfiguration messages are included in second RLC SDUs, and the first RLC SDU and at least one of the M second RLC SDUs are included in one RLC PDU.

In a possible implementation, the apparatus further includes a transmitter; the transmitter is configured to send the second radio resource reconfiguration message to the second UE; and the processor is further configured to hand over the handover apparatus from the first network device to the second network device after sending the M second radio resource reconfiguration messages is completed.

In a possible implementation, the transmitter is further configured to send the second radio resource reconfiguration message to the second UE; the receiver is further configured to receive indication information that is fed back by the second UE and that indicates that the second radio resource reconfiguration message is successfully received; and the processor is further configured to hand over the handover apparatus from the first network device to the second network device after the handover apparatus receives M pieces of indication information.

In a possible implementation, the processor is further configured to suspend transmission and reception of data on a radio bearer over a link between the handover apparatus and the second UE.

In a possible implementation, the processor is further configured to: when handing over the handover apparatus from the first network device to the second network device according to the first handover command, if there is second UE connected to the second network device by using the handover apparatus, re-establish a radio bearer over a link between the handover apparatus and the second UE.

In a possible implementation, the processor is further configured to: when handing over the handover apparatus from the first network device to the second network device according to the first handover command, if there is no second UE connected to the second network device by using the handover apparatus, release the radio bearer over the link between the handover apparatus and the second UE.

In a possible implementation, the processor is further configured to: if there is the second UE connected to the second network device by using the handover apparatus, resume transmission and reception of data on the radio bearer over the link between the handover apparatus and the second UE; and the transmitter is further configured to send a first message to the second UE, where the first message is used to instruct the second UE to resume transmission and reception of the data on the radio bearer over the link between the second UE and the handover apparatus.

In a possible implementation, the transmitter is further configured to: if there is no second UE connected to the second network device by using the handover apparatus, send the second radio resource reconfiguration message to the second UE.

In a possible implementation, the transmitter is further configured to: if there is no second UE connected to the second network device by using the handover apparatus, send a second message to the second UE before the handover apparatus is handed over from the first network device to the second network device, where the second message is used to instruct the second UE to suspend transmission and reception of data on a radio bearer over a link between the second UE and the handover apparatus; the processor is further configured to suspend transmission and reception of the data on the radio bearer over the link between the handover apparatus and the second UE; the transmitter is further configured to send the second message to the second UE after the handover apparatus is handed over from the first network device to the second network device, where the second message is used to instruct the second UE to resume transmission and reception of the data on the radio bearer over the link between the second UE and the handover apparatus; the processor is further configured to resume transmission and reception of the data on the radio bearer over the link between the handover apparatus and the handover apparatus; and the transmitter is further configured to send the second radio resource reconfiguration message to the second UE.

In a possible implementation, the processor is further configured to: if there is no second UE connected to the second network device by using the handover apparatus, release a connection of the link between the handover apparatus and the second UE.

In a possible implementation, the transmitter is further configured to: if there is second UE connected to the second network device by using the handover apparatus, send the second radio resource reconfiguration message to the second UE; and the processor is further configured to re-establish a radio bearer over a link between the handover apparatus and the second UE.

In a possible implementation, the transmitter is further configured to: if there is second UE connected to the second network device by using the handover apparatus, send a second message to the second UE before the handover apparatus is handed over from the first network device to the second network device, where the second message is used to instruct the second UE to suspend transmission and reception of data on a radio bearer over a link between the second UE and the handover apparatus; the processor is further configured to suspend transmission and reception of the data on the radio bearer over the link between the handover apparatus and the second UE; the transmitter is further configured to send a third message to the second UE after the handover apparatus is handed over from the first network device to the second network device, where the third message is used to instruct the second UE to resume transmission and reception of the data on the radio bearer over the link between the second UE and the handover apparatus; the processor is further configured to resume transmission and reception of the data on the radio bearer over the link between the handover apparatus and the handover apparatus; the transmitter is further configured to send the second radio resource reconfiguration message to the second UE; and the processor is further configured to re-establish a radio bearer over the link between the handover apparatus and the second UE.

According to a third aspect, an embodiment of the present invention provides a computer storage medium, configured to store a computer software instruction used by the first UE, and the computer storage medium includes a program designed for executing the first aspect and all the possible implementations of the first aspect.

BRIEF DESCRIPTION OF THE DRAWINGS

FIG. 3a-1 and FIG. 3a-2 are a schematic diagram of a control plane protocol stack when a first network device, first UE, and second UE communicate with each other;

FIG. 3b-1 and FIG. 3b-2 are a schematic diagram of a user plane protocol stack when a first network device, first UE, and second UE communicate with each other;

FIG. 4 is a schematic flowchart of a handover method according to an embodiment of the present invention;

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention.

In the specification, claims, and accompanying drawings of this application, the terms "first", "second", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 2:
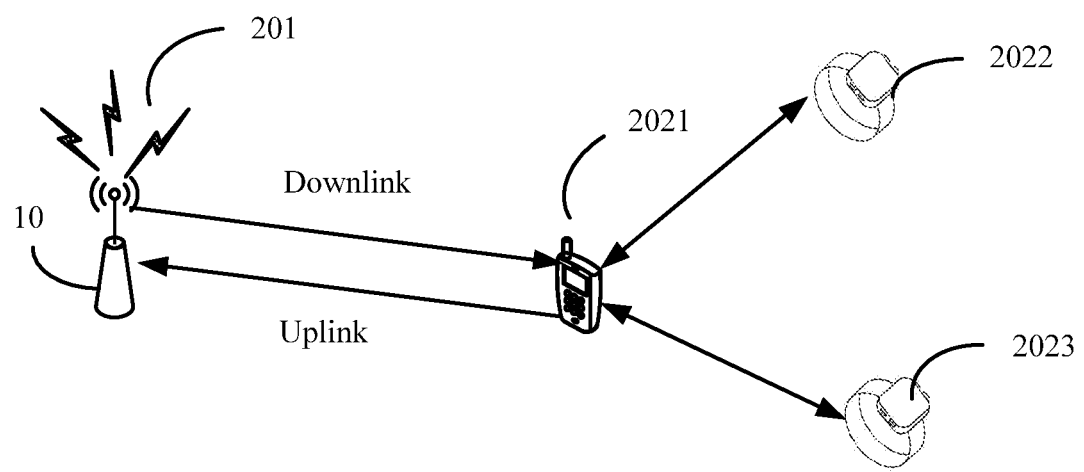
FIG. 2 is a schematic diagram of a system architecture to which an embodiment of the present invention is applicable.

A handover method in an embodiment of the present invention is applicable to a plurality of system architectures. FIG. 2 is a schematic diagram of a system architecture to which an embodiment of the present invention is applicable. As shown in FIG. 2, the system architecture includes a network device 201 and one or more terminals, such as a first terminal 2021, a second terminal 2022, and a third terminal 2023 shown in FIG. 2. The first terminal is a relay terminal. The second terminal 2022 and the third terminal 2023 may transmit information with the network device 201 by using the network device 201. Further, the first terminal 2021, the second terminal 2022, and the third terminal 2023 may transmit information to each other.

In this embodiment of the present invention, the network device includes but is not limited to a NodeB NodeB, an evolved NodeB eNodeB, a base station in a 5th-generation (the 5th-generation, 5G) communications system, a base station in a future communications system, an access node in a Wi-Fi system, a wireless relay node, a wireless backhaul node, and UE. The base station is an apparatus deployed in a radio access network to provide a wireless communication function. For example, a device that provides a base station function in a 2G network includes a base transceiver station (base transceiver station, BTS) and a base station controller (base station controller, BSC). A device that provides a base station function in a 3G network includes a NodeB (NodeB) and a radio network controller (radio network controller, RNC). A device that provides a base station function in a 4G network includes an evolved NodeB (evolved NodeB, eNB). A device that provides a base station function in a 5G network includes a new radio NodeB (New Radio NodeB, gNB), a centralized unit (Centralized Unit, CU), a distributed unit (Distributed Unit), and a new radio controller. In a WLAN, a device that provides a base station function is an access point (Access Point, AP).

The terminal may be a device (device) providing voice and/or data connectivity for a user, and may include a wireless terminal and a wired terminal. The wireless terminal may be a handheld device having a wireless connection function, or another processing device connected to a wireless modem. The terminal communicates with one or more core networks through a radio access network (radio access network, RAN), or may access a distributed network in a self-organizing manner or a grant free manner, or may access a wireless network in another manner to perform communication. Alternatively, the terminal may directly perform wireless communication with another terminal, or the terminal may directly perform wireless communication with another terminal. For example, the terminal may be a mobile phone, a computer, a tablet computer, a personal digital assistant (Personal Digital Assistant, PDA), a mobile Internet device (Mobile Internet Device, MID), a wearable device, an e-book reader (e-book reader), or the like. For another example, the wireless terminal may be a portable, pocket-sized, handheld, computer built-in, or in-vehicle mobile device. For still another example, the wireless terminal may be a mobile station (Mobile Station), an access point (Access Point), or a part of UE.

A communications system to which the foregoing system architecture is applicable includes but is not limited to a code division multiple access (Code Division Multiple Access, CDMA) IS-95 system, a code division multiple access (Code Division Multiple Access, CDMA) 2000 system, a time division-synchronous code division multiple access (Time Division-Synchronous Code Division Multiple Access, TD-SCDMA) system, a wideband code division multiple access (Wideband Code Division Multiple Access, WCDMA) system, a time division duplexing-long term evolution (Time Division Duplexing-Long Term Evolution, TDD LTE) system, a frequency division duplexing-long term evolution (Frequency Division Duplexing-Long Term Evolution, FDD LTE) system, a long term evolution advanced (Long Term Evolution Advanced, LTE-Advanced) system, and various future evolved wireless communications systems (such as a 5G system).

Based on the foregoing system architecture, in an application scenario of this embodiment of the present invention, a first network device is the network device 201, first UE is the first terminal 2021, and second UE is any one or a combination of the second terminal 2022 and the third terminal 2023.

Figure 1:
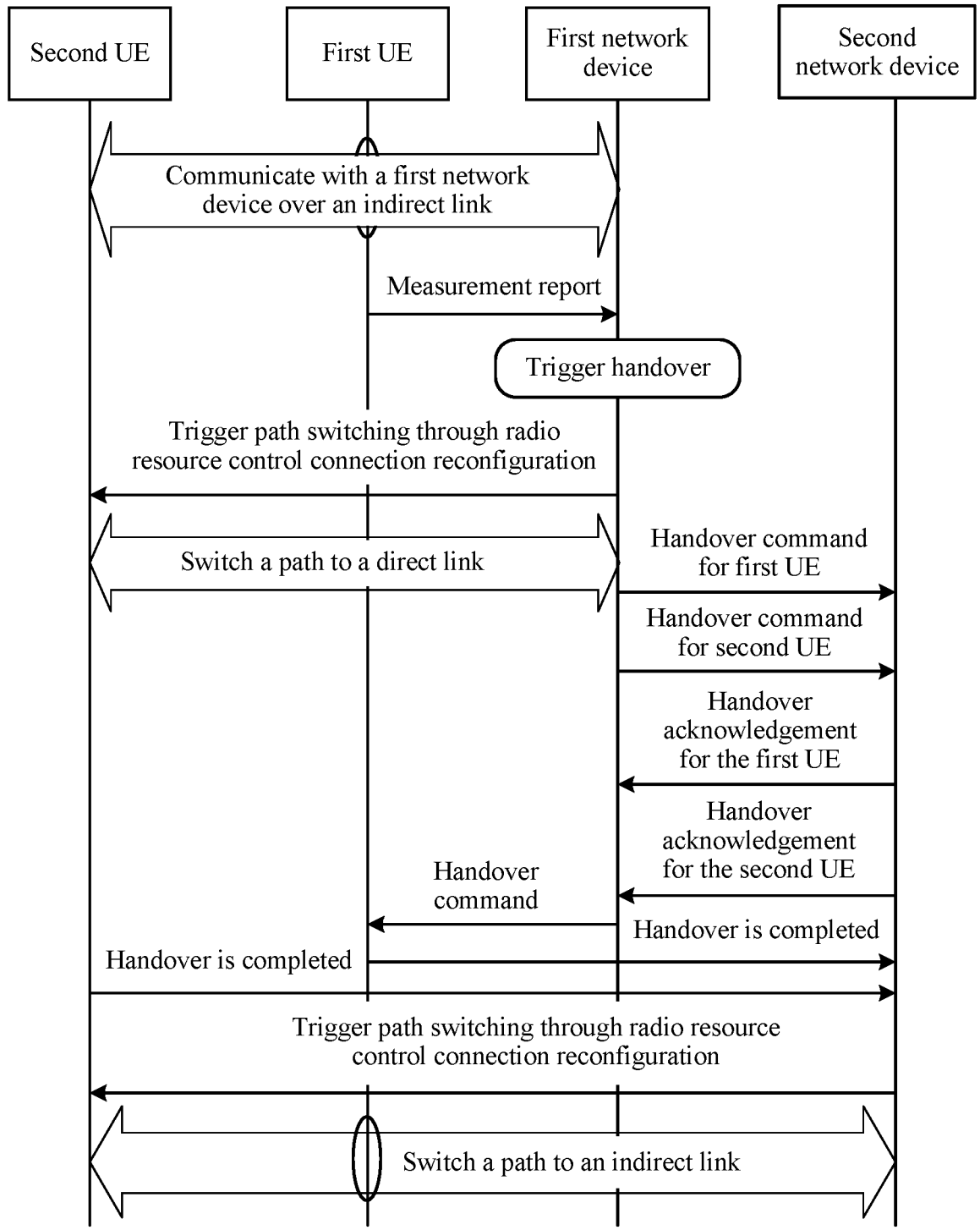
FIG. 1 is a schematic flowchart showing that evolved remote UE and evolved relay UE are handed over from a source base station to a target base station in the prior art.
Figures 1, 3A:
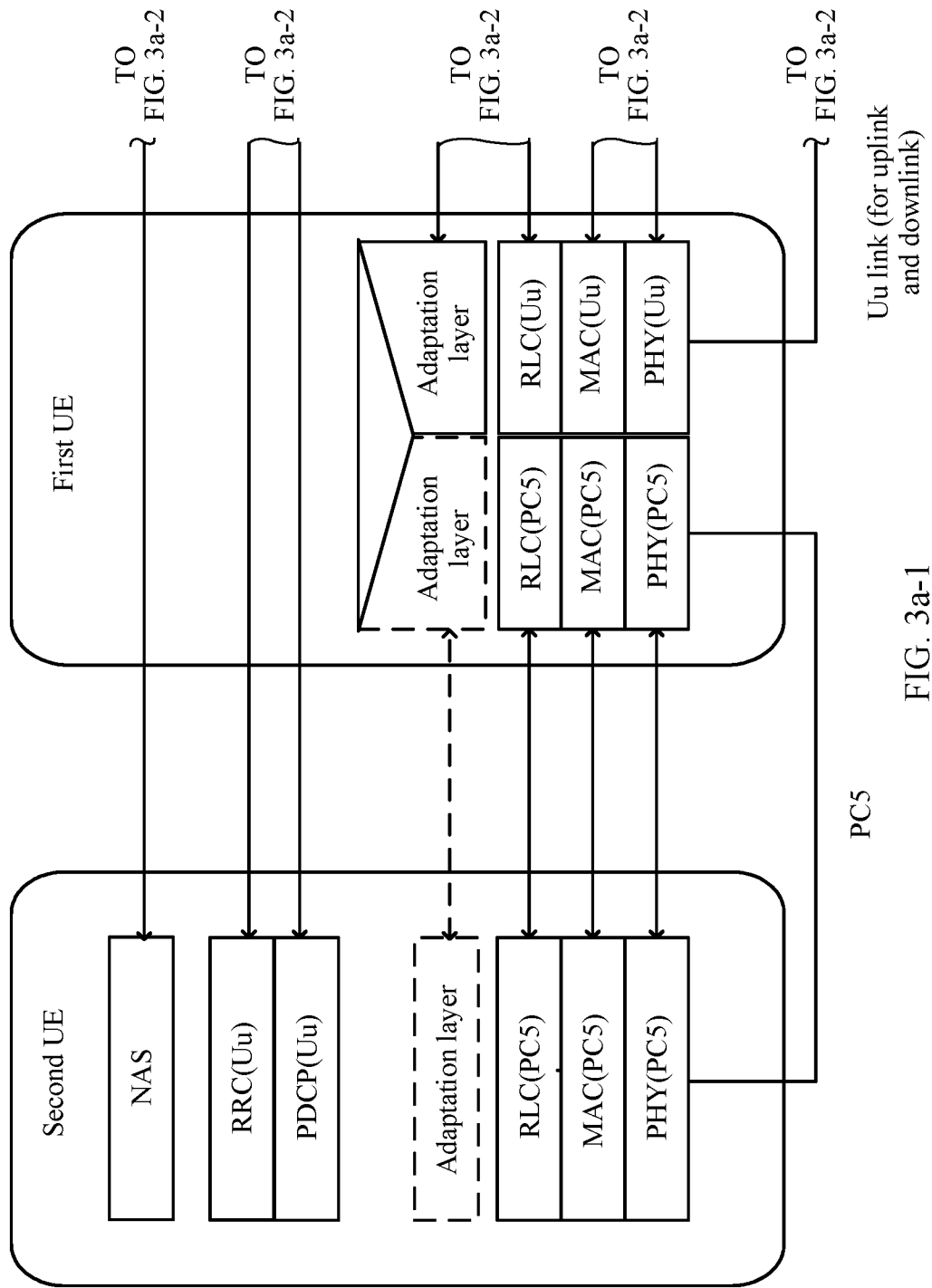
Figures 2, 3A:
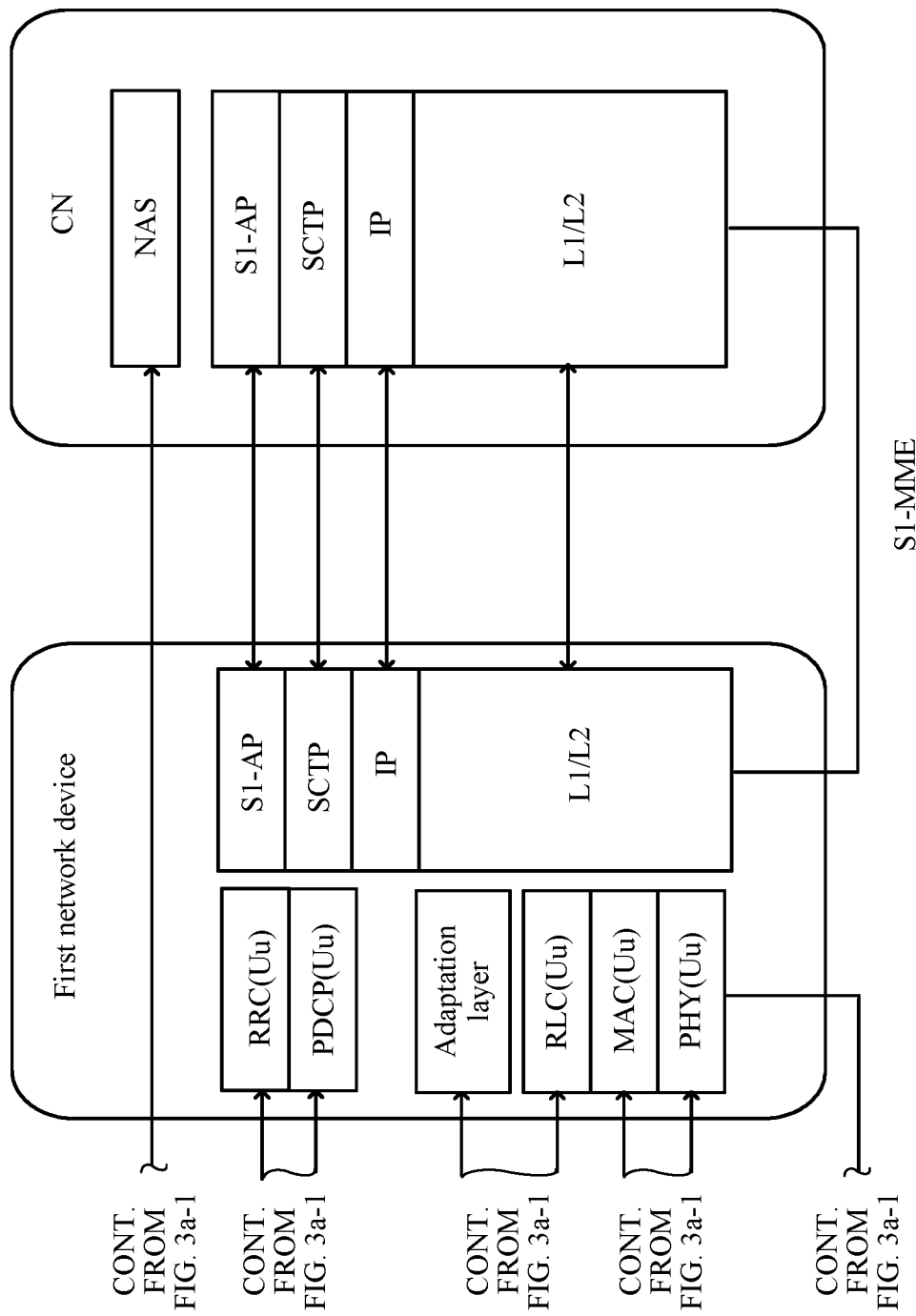
Figures 1, 3B:
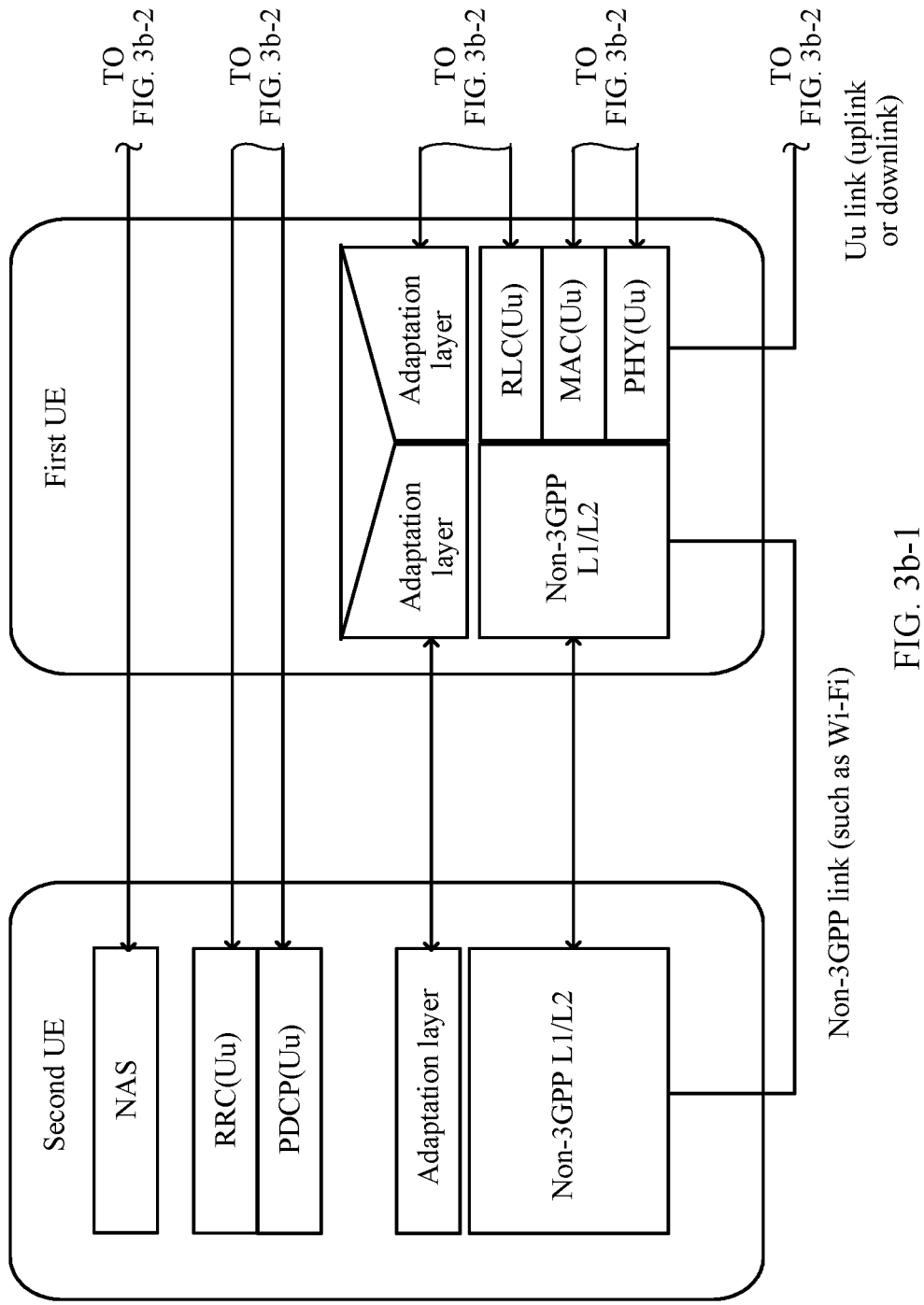
Figures 2, 3B:
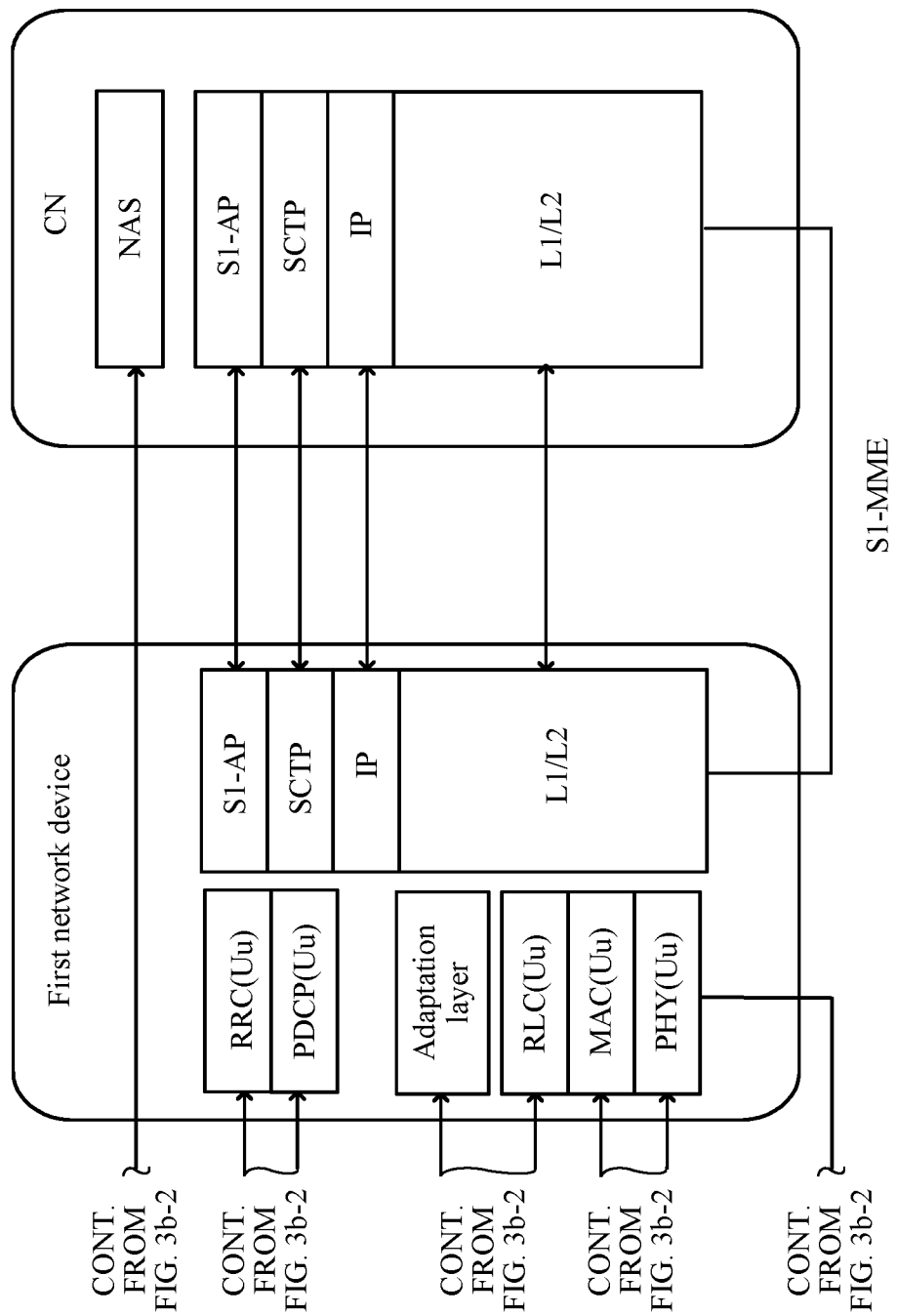

When the first network device, the first UE, and the second UE communicate with each other, a control plane protocol stack is shown in FIG. 3a-1 and FIG. 3a-2, and a user plane protocol stack is shown in FIG. 3b-1 and FIG. 3b-2.

The first UE and the second UE in this embodiment of this application may be deployed on land, for example, may be indoor, outdoor, handheld, or in-vehicle, or may be deployed on water, or may be deployed on an airplane, a balloon, and a satellite in the sky. The UE in this embodiment of this application may be a mobile phone, a tablet computer (Pad), a computer with a wireless receive/transmit function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The application scenario is not limited in this embodiment of this application.

The following uses examples to describe a process in which the first UE and the second UE are handed over from the first network device to a second network device or a third network device. FIG. 3a-1 and FIG. 3a-2 are a schematic diagram of a control plane protocol stack when the first network device, the first UE, and the second UE communicate with each other, and FIG. 3b-1 and FIG. 3b-2 are a schematic diagram of a user plane protocol stack when the first network device, the first UE, and the second UE communicate with each other.

FIG. 4 is a schematic flowchart of a handover method according to an embodiment of the present invention. As shown in FIG. 4, the handover method 400 includes the following steps:

Step 410: First UE receives a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the first UE from the first network device to a second network device, the second radio resource reconfiguration message includes a second handover command, the second handover command is used to instruct to hand over second UE from the first network device to a third network device, M is a quantity of second UEs in a radio resource control (Radio Resource Control, RRC) connected mode that are connected to the first UE, M is an integer greater than or equal to 1, and the second network device is the same as or different from the third network device.

Step 420: Hand over the first UE from the first network device to the second network device according to the first handover command.

When the first UE needs to be handed over, the second UEs in the RRC connected mode that keep a short-distance communication connection to the first UE may be classified into the following two types.

A first type of second UE is still connected to the second network device by using the first UE after the first UE is handed over.

A second type of second UE is no longer connected to the second network device by using the first UE after the first UE is handed over. In this case, for example, the second UE may be connected to the second network device or the third network device over a direct link.

When the first UE is handed over, if there are still several second UEs connected to the second network device by using the first UE, when the first UE is handed over, there are four cases:

Case 1: The first UE and all the second UEs are handed over together to the same second network device, and after the handover, the second UEs are still connected to the second network device by using the first UE.

Case 2: The first UE and all the second UEs are handed over to the same second network device, but each of the second UEs performs a handover process of handover to the second network device. After being handed over to the second network device, all the second UEs are no longer connected to the second network device by using the first UE, but are connected to the second network device over direct links.

Case 3: The first UE and all the second UEs are handed over to different network devices, to be specific, the first UE is handed over to the second network device, and the second UEs are handed over to the third network device. The second network device is different from the third network device. Each of the second UEs performs a process of handover to the third network device. After being handed over to the third network device, all the second UEs are no longer connected to the third network device by using the first UE, but are connected to the third network device over direct links.

Case 4: The first UE and one part of second UEs are handed over together to a same network device, namely, the second network device, and after the handover, this part of second UEs are still connected to the second network device by using the first UE. The other part of second UEs and the first UE are handed over to a same network device or different network devices, to be specific, in the other part of second UEs, some second UEs are handed over to the second network device, and the other second UEs are handed over to the third network device. The second network device is different from the third network device. Each of the other part of second UEs performs a process of handover to the second network device or the third network device. After being handed over to the second network device or the third network device, the other part of second UEs are no longer connected to the second network device or the third network device by using the first UE, but are connected to the second network device or the third network device over direct links.

Figure 5A:
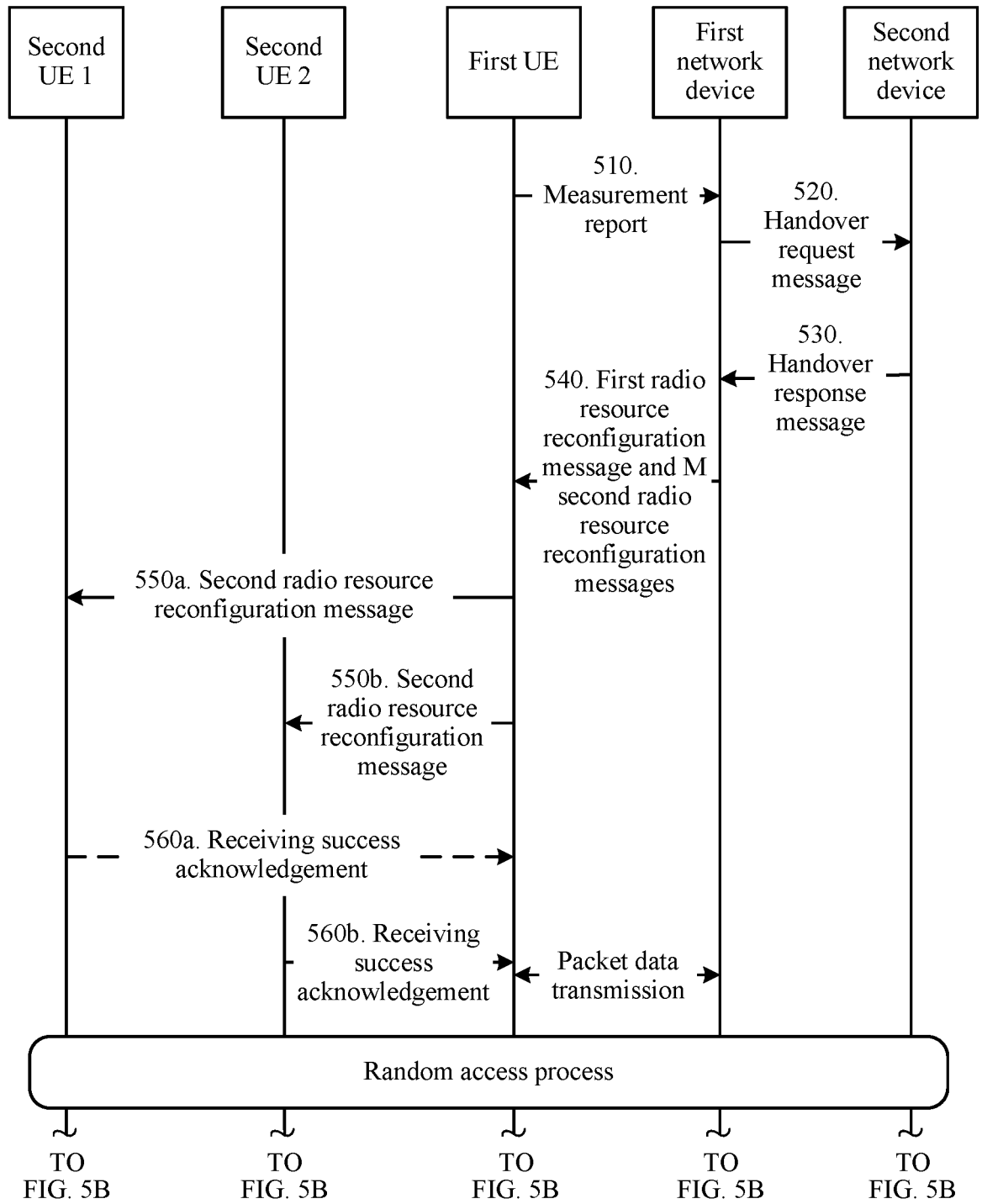
FIG. 5A and FIG. 5B are a diagram of interaction among first UE, second UE, a first network device, and a second network device according to an embodiment of the present invention.
Figure 5B:
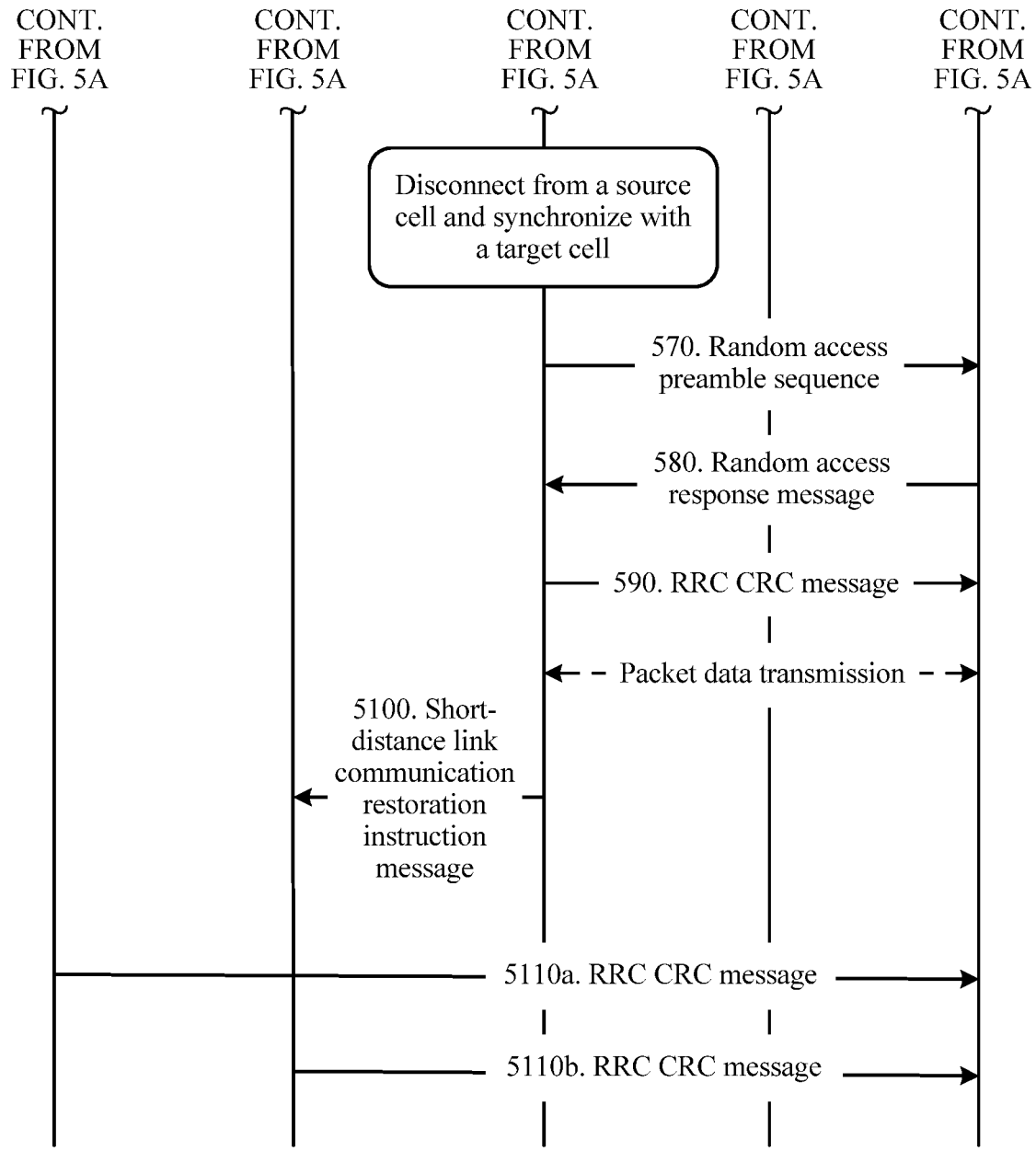

With reference to FIG. 5A and FIG. 5B, the following further describes FIG. 4 by using interaction among the first UE, the second UE, the first network device, and the second network device as an example. FIG. 5A and FIG. 5B are a diagram of interaction among the first UE, the second UE, the first network device, and the second network device according to an embodiment of the present invention. Second UE 1 is the second type of second UE, and second UE 2 is the first type of second UE.

Step 510: The first UE sends a measurement report to the first network device.

When the second UE communicates with the first network device by using the first UE, the first UE reports a Uu link (uplink or downlink) measurement result to the first network device. The measurement result may include information about a neighboring cell, and the information about the neighboring cell may include signal strength of the neighboring cell, signal quality of the neighboring cell, or the like.

Step 520: The first network device sends a handover request message to the second network device.

The first network device determines the second network device based on the measurement result. For example, the first network device may determine, based on the signal quality of the neighboring cell, a target cell in which the second network device is located, and determine the second network device in the target cell based on information such as a priority, a capacity, and load of a base station in the target cell.

After determining the second network device, the first network device sends the handover request message to the second network device, and the handover request message includes context information of the first UE and the second UE, for example, first identifier information, a key, and the like of the first UE, and first identifier information, a key, and the like of the second UE. There may be one or more handover request messages. When there are a plurality of handover request messages, each handover request message corresponds to one UE.

Step 530: The second network device sends a handover response message to the first network device.

The first network device receives the handover response message sent by the second network device. The handover response message may include at least one of a device identifier of the first UE, identifier information of second UE accepted by the second network device, and a device identifier of second UE that is not accepted by the second network device. The device identifier of the first UE is different from the first identifier information. There may be one or more handover response messages. When there are a plurality of handover response messages, each handover acknowledgement message corresponds to one UE.

Step 540: The first UE receives a first radio resource reconfiguration message and M second radio resource reconfiguration messages, where the first radio resource reconfiguration message and the M second radio resource reconfiguration messages are sent by the first network device.

The first radio resource reconfiguration message includes a first handover command, the first handover command is used to instruct to hand over the first UE from the first network device to the second network device, the second radio resource reconfiguration message includes a second handover command, the second handover command is used to instruct to hand over the second UE from the first network device to a third network device, M is a quantity of second UEs in an RRC connected mode that are connected to the first UE, and the second network device is the same as or different from the third network device.

Further, the first radio resource reconfiguration message includes first information, and the first information includes at least one of first indication information and second indication information.

The first indication information is used to indicate second UE connected to the second network device by using the first UE after the first UE is handed over to the second network device, a quantity of second UEs connected to the second network device by using the first UE is X, and X is an integer that is not greater than M.

The second indication information is used to indicate second UE that is connected to the second network device not by using the first UE after the first UE is handed over to the second network device, and a quantity of second UEs that are connected to the second network device not by using the first UE is M-X.

The first indication information or the second indication information is specifically a device identifier of the second UE. For example, the device identifier is UE*, where * is a number of the second UE. When M is 3, if the first information includes only the first indication information, for example, (UE2, UE3, and UE4), it indicates that all second UEs are connected to the second network device by using the first UE, in other words, X is 3. If the first information includes only the second indication information, for example, (UE2, UE3, and UE4), it indicates that all second UEs are connected to the second network device not by using the first UE, in other words, X is 0. If the first information includes the first indication information (UE2) and the second indication information (UE3 and UE4), it indicates that the UE2 is connected to the second network device by using the first UE, in other words, X is 1, and the UE3 and the UE4 are connected to the second network device not by using the first UE.

Further, when a short-distance communication link between the first UE and the second UE is connected over a sidelink, the first radio resource reconfiguration message includes second information, and the second information includes a configuration of a resource or a resource pool used to send the second radio resource configuration message over the sidelink.

Further, before step 540, the method includes a step of generating, by the first network device, the first radio resource reconfiguration message and the second radio resource reconfiguration messages. A first RLC service data unit (Service Data Unit, SDU) and a second RLC SDU are generated by different protocol entities in the first network device. Therefore, the first radio resource reconfiguration message is included in the first RLC SDU, and the second radio resource reconfiguration messages are included in second RLC SDUs. The first RLC SDU and at least one of the M second RLC SDUs are included in one RLC protocol data unit (Protocol Data Unit, PDU).

The following describes a process about how protocol entities in the first network device generate the RLC PDU, the first RLC SDU, and the second RLC SDU.

Figure 6:
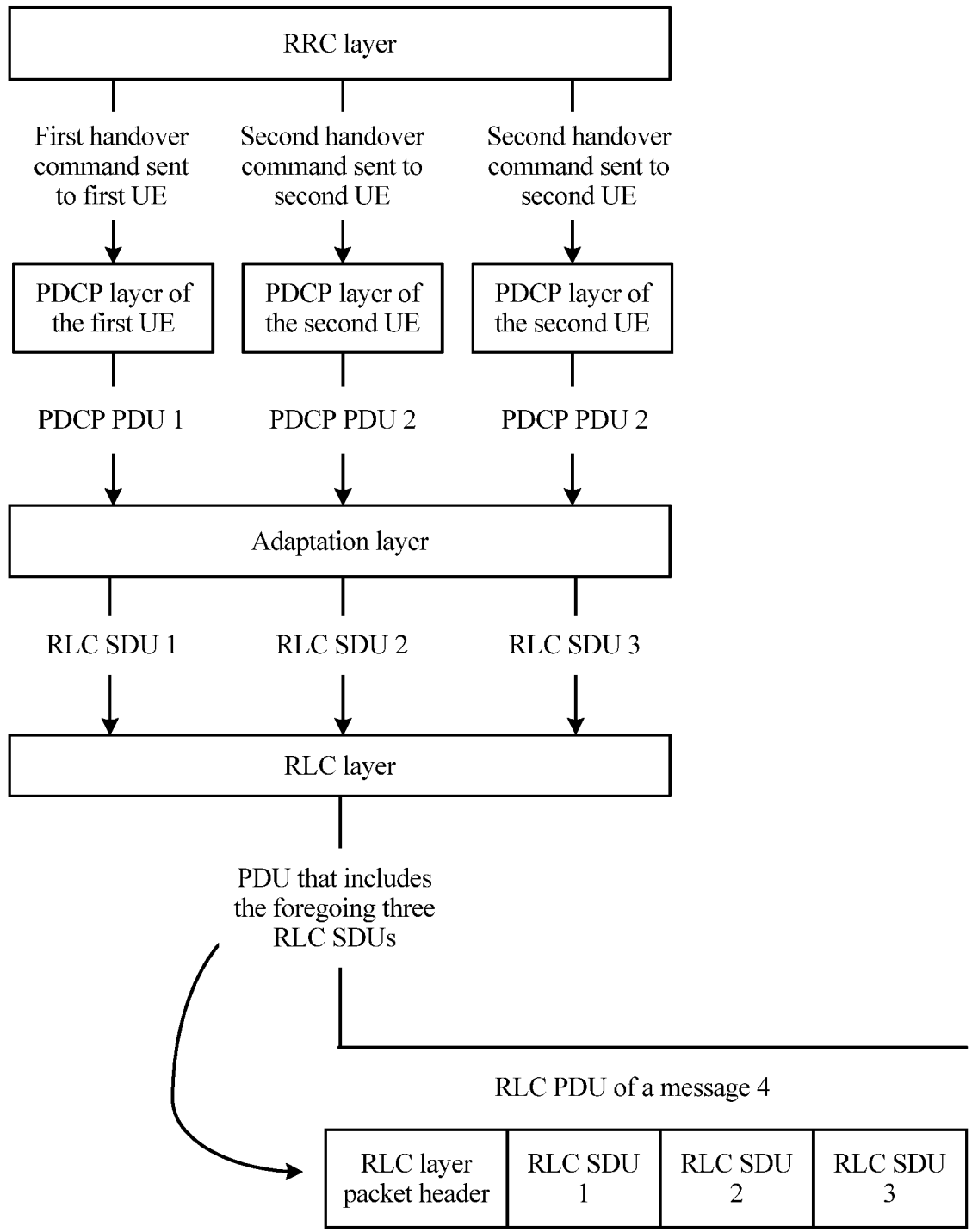
FIG. 6 is a schematic diagram showing that a first network device generates an RLC PDU, a first RLC SDU, and a second RLC SDU.

FIG. 6 is a schematic diagram showing that the first network device generates the RLC PDU, the first RLC SDU, and the second RLC SDU. As shown in FIG. 6, after receiving the handover response message sent by the second network device, an RRC layer of the first network device separately generates the first handover command sent to the first UE and the second handover command sent to the second UE. Then, the RRC layer sends the first handover command to a PDCP entity that is configured to transmit a signaling radio bearer (Signaling Radio Bearer, SRB) of the first UE and that is to process the first handover command, and the RRC layer sends the second handover command to a PDCP entity that is configured to transmit an SRB of the second UE and that is to process the second handover command. The processing herein is mainly performing header compression on protocols of convergence protocols in the first handover command and the second handover command, to separately generate PDCP protocol data units (Protocol Data Unit, PDU). Subsequently, each PDCP entity sends a generated PDCP PDU to an adaptation (Adaptation) layer for processing. In this case, the processing is performing encryption by adding second identifier information. After the processing, the adaptation layer sends each encrypted PDCP PDU to a common RLC entity. Then, the RLC entity encapsulates an RLC SDU corresponding to the PDCP PDU into an RLC PDU. Finally, the first network device sends the RLC PDU to the first UE.

After the RLC PDU is received, an RLC entity that is of the first UE and that is configured to receive an SRB1 sends the first RLC SDU and the second RLC SDU in the RLC PDU to the adaptation layer. The adaptation layer respectively submits a PDCP PDU corresponding to the first RLC SDU and a PDCP PDU corresponding to the second RLC SDU to corresponding protocol layers based on a device identifier of the first RLC SDU and a device identifier of the second RLC SDU. To be specific, the PDCP PDU corresponding to the first RLC SDU is sent to a PDCP entity of the first UE, and the PDCP PDU corresponding to the second RLC SDU is sent to an uppermost protocol layer used to process data of the second UE over a short-distance link.

Figure 7A:
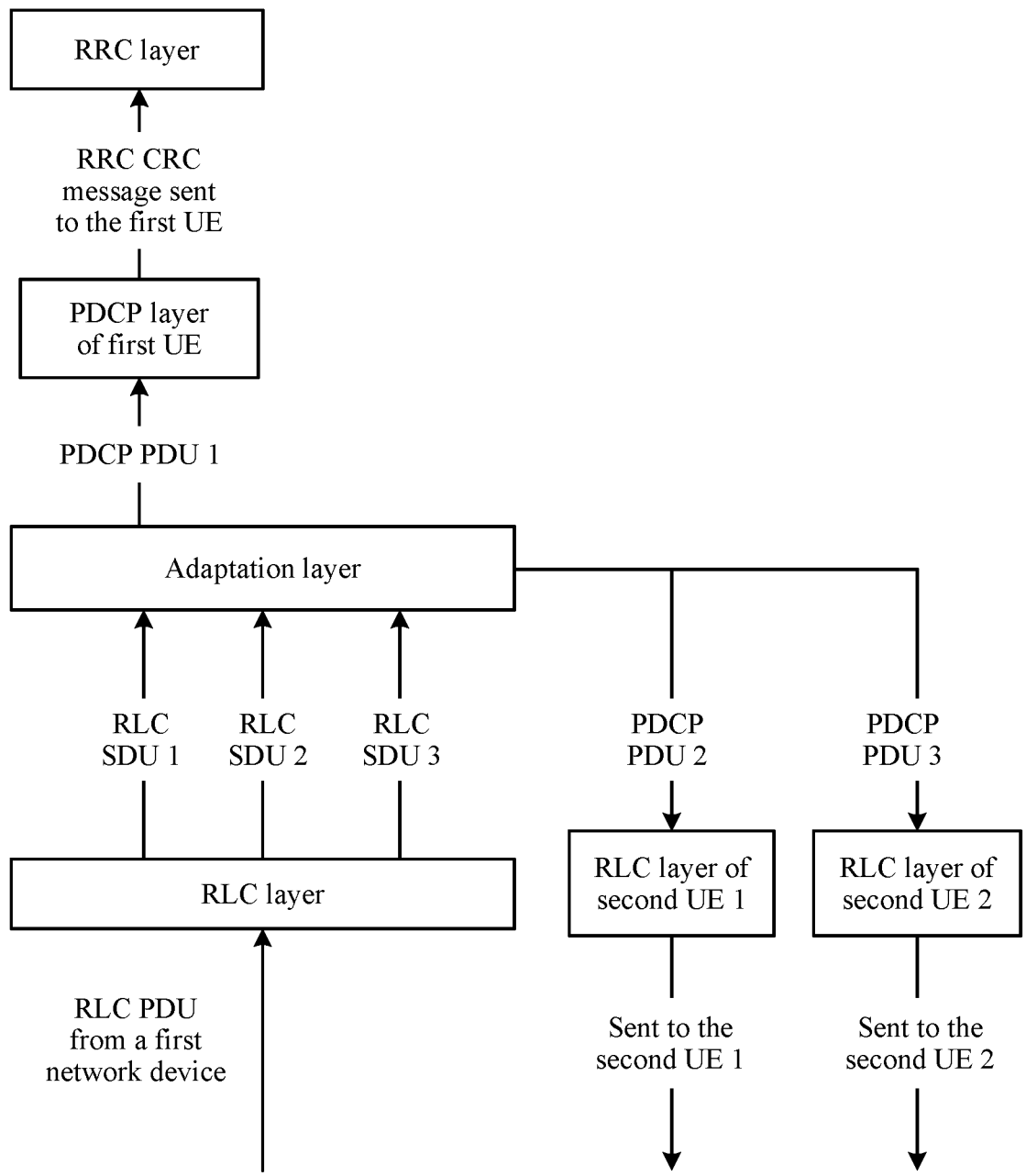
FIG. 7a is a first schematic diagram showing that first UE processes an RLC PDU, a first RLC SDU, and a second RLC SDU.

When the first UE and the second UE are connected over the short-distance link by using a PC5 technology/sidelink technology, the uppermost protocol layer is correspondingly an RLC layer of the second UE, as shown in FIG. 7a.

Figure 7B:
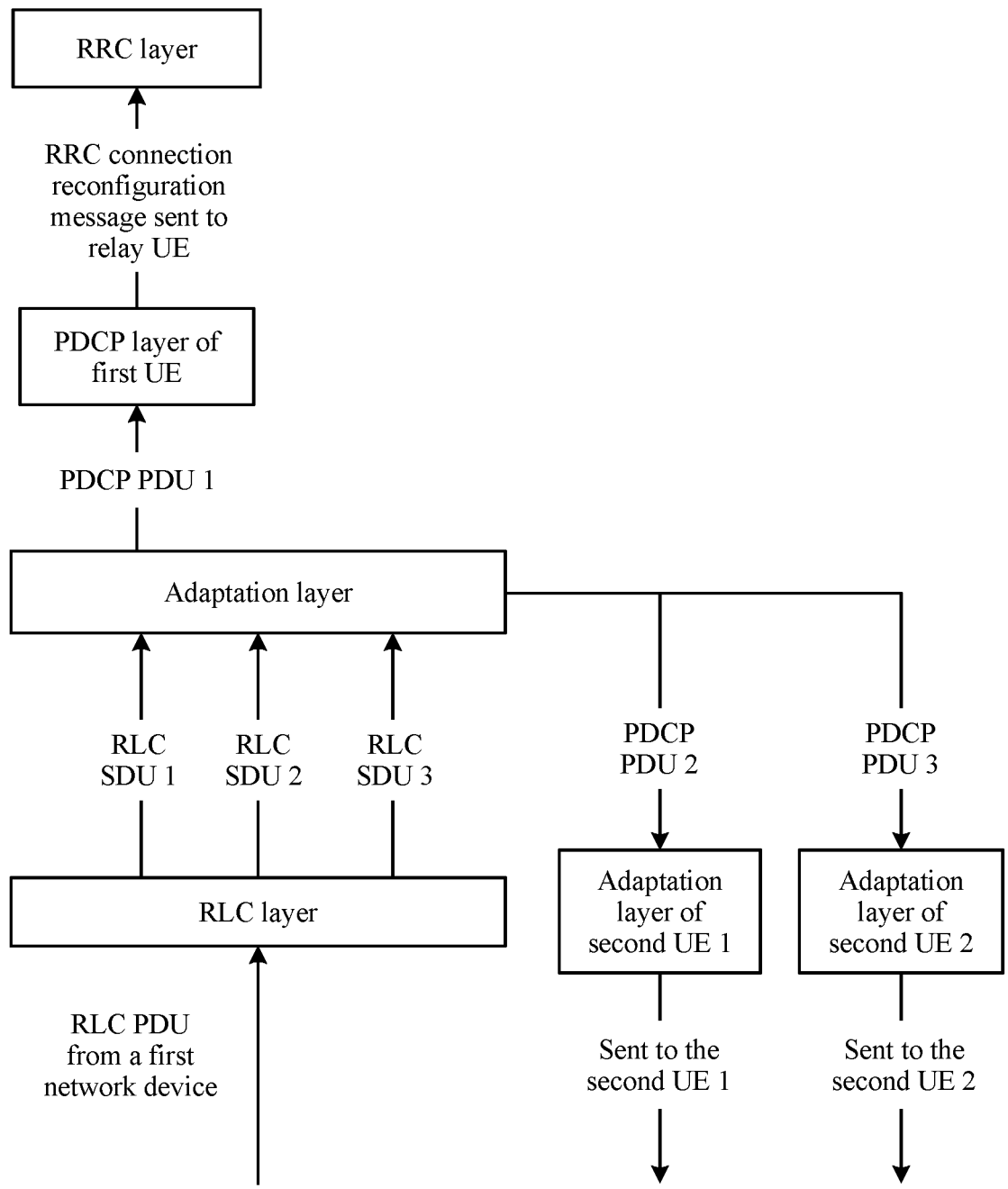
FIG. 7b is a second schematic diagram showing that first UE processes an RLC PDU, a first RLC SDU, and a second RLC SDU.

When the first UE and the second UE are connected over the short-distance link by using a non-3GPP technology, the uppermost protocol layer is correspondingly an adaptation layer of the second UE, as shown in FIG. 7b.

Before the first UE is handed over from the first network device to the second network device, the method further includes step 550 and step 560.

Step 550: The first UE sends the second radio resource reconfiguration message to the second UE.

Step 550a: The first UE sends a second radio resource reconfiguration message to the second type of second UE.

Step 550b: The first UE sends a second radio resource reconfiguration message to the first type of second UE.

Optionally, after step 550, the method further includes:

Step 560: The first UE receives indication messages that are fed back by the second UE and that indicate that the second radio resource reconfiguration is successfully received.

Step 560a: The first UE receives an indication message that is fed back by the second type of second UE and that indicates that the second radio resource reconfiguration is successfully received.

Step 560b: The first UE receives an indication message that is fed back by the first type of second UE and that indicates that the second radio resource reconfiguration is successfully received.

In this embodiment, the first UE may be handed over after the first UE sends the second radio resource reconfiguration message to the second UE. In a next embodiment, referring to FIG. 9A and FIG. 9B, the first UE may be alternatively handed over before the first UE sends the second radio resource reconfiguration message to the second UE.

For a specific time when the first UE is handed over from the first network device to the second network device, there are two cases.

In a first case, the first UE sends the second radio resource reconfiguration message to the second UE; and the first UE is handed over from the first network device to the second network device after the first UE completes sending the M second radio resource reconfiguration messages.

After an uppermost protocol layer used to process data of each second UE over a short-distance link sends a PDCP PDU that corresponds to a second radio resource reconfiguration message and that needs to be forwarded to the second UE, the uppermost protocol feeds back indication information to an RRC layer of the first UE, based on processing manners in FIG. 7a and FIG. 7b. In other words, after an uppermost protocol layer used to process data of each second UE over a short-distance link sends a PDCP PDU corresponding to a second RLC SDU including a second radio resource reconfiguration message, the uppermost protocol feeds back indication information to an RRC layer of the first UE.

Figure 8A:
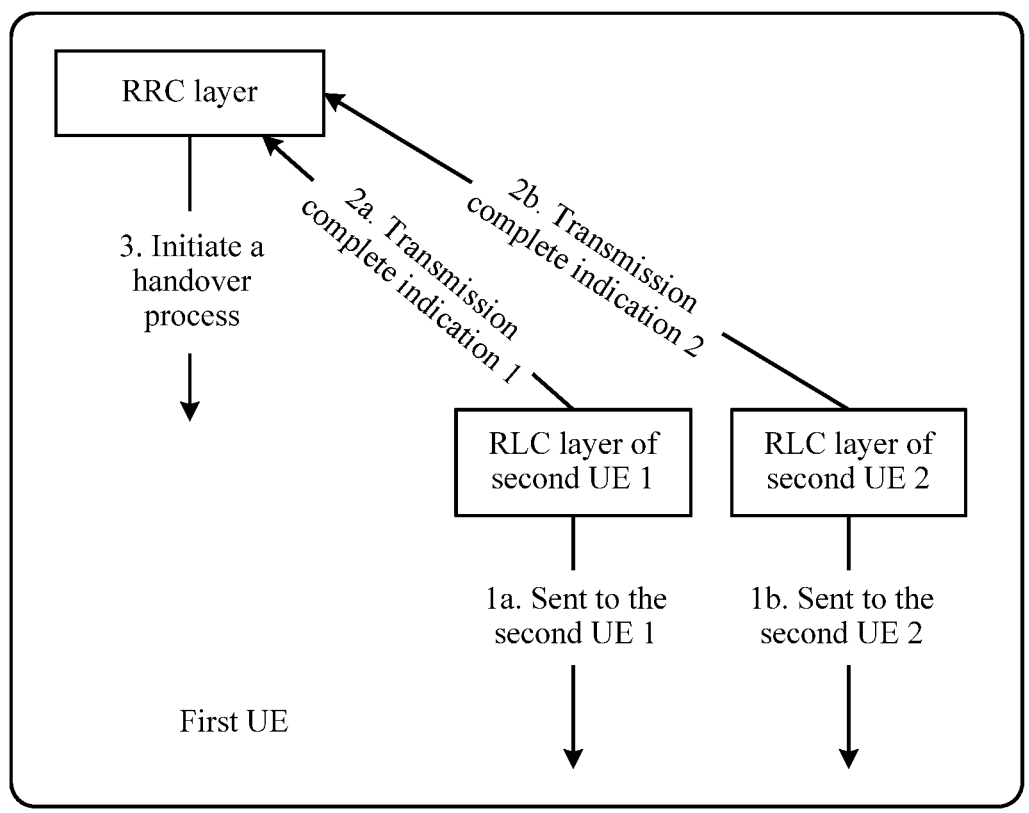
FIG. 8a is a first schematic diagram showing that an entity in second UE processes a second radio resource reconfiguration message.

After the RRC layer of the first UE determines that sending all PDCP PDUs corresponding to the M second radio resource reconfiguration messages is completed, the RRC layer of the first UE initiates a process of handover to the second network device. FIG. 8a is a first schematic diagram showing that an entity in second UE processes a second radio resource reconfiguration message.

Further, after the first UE sends the second radio resource reconfiguration message to the second UE, the first UE suspends transmission and reception of data on a radio bearer over the short-distance communication link between the first UE and the second UE.

When the first UE and the second UE are connected over the short-distance link by using a sidelink technology, the first UE suspends processing on an RLC entity on the radio bearer over the short-distance communication link between the first UE and the second UE, and suspends transmission and reception of bottom-layer data. When the first UE and the second UE are connected over the short-distance link by using a non-3GPP technology, the first UE suspends processing on an adaptation layer on the radio bearer over the short-distance communication link between the first UE and the second UE, and suspends transmission and reception of bottom-layer data.

In a second case, the first UE sends the second radio resource reconfiguration message to the second UE; the first UE receives the indication information that is fed back by the second UE and that indicates that the second radio resource reconfiguration message is successfully received; and after the first UE receives M pieces of indication information, the first UE is handed over from the first network device to the second network device.

An uppermost protocol layer used to process data of each second UE over a short-distance link sends a PDCP PDU corresponding to a second radio resource reconfiguration message to the corresponding second UE, based on processing manners in FIG. 6a and FIG. 6b. In other words, an uppermost protocol layer used to process data of each second UE over a short-distance link first sends a PDCP PDU corresponding to a second RLC SDU unit including a second radio resource reconfiguration message. Then the uppermost protocol layer receives indication information that is fed back by the second UE and that indicates that the second radio resource reconfiguration message is successfully received. In other words, the uppermost protocol layer receives indication information that is fed back by the second UE and that indicates that the second RLC SDU including the second radio resource reconfiguration message is successfully received. Finally, the uppermost protocol layer feeds back an indication to an RRC layer of the first UE.

Figure 8B:
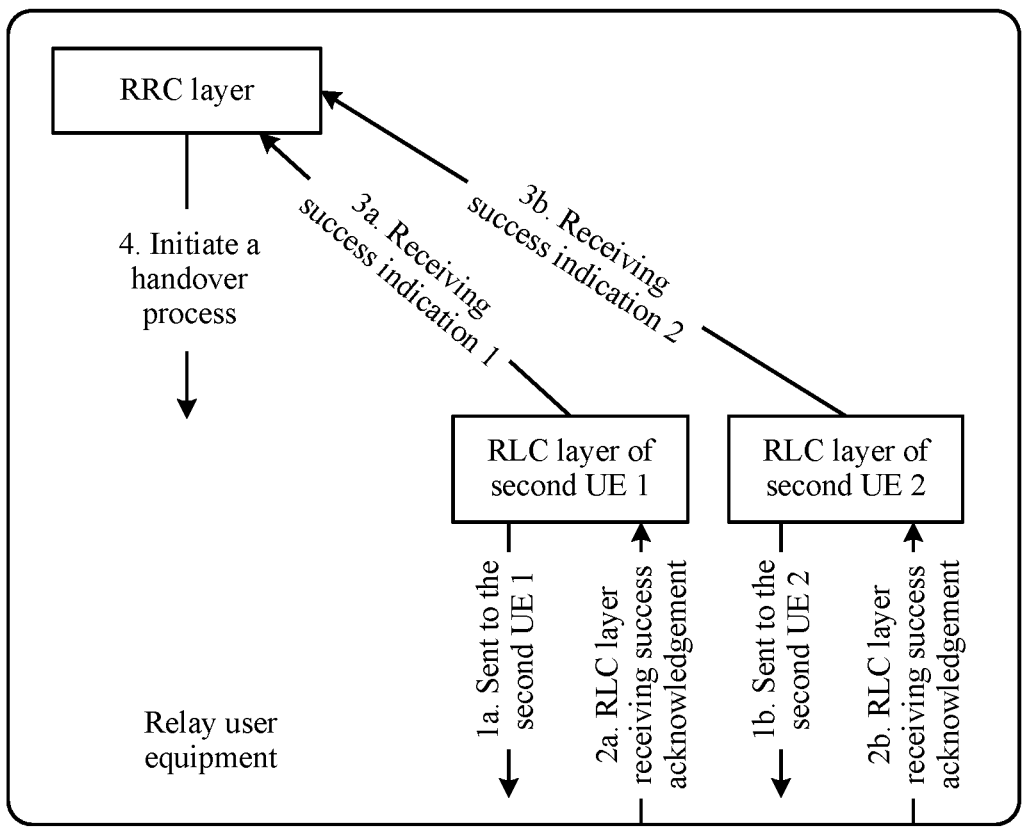
FIG. 8b is a second schematic diagram showing that an entity in second UE processes a second radio resource reconfiguration message.

After the RRC layer of the first UE determines that M pieces of indication information that are fed back by the second UE and that indicate that the second radio resource reconfiguration messages are successfully received are received, the first UE starts to be handed over from the first network device to the second network device. FIG. 8b is a second schematic diagram showing that an entity in second UE processes a second radio resource reconfiguration message.

Step 570: The first UE sends a random access preamble sequence.

Step 580: The first UE receives a random access response message sent by the second network device.

Step 590: The first UE sends an RRC connection reconfiguration complete (Connection Reconfiguration Complete, CRC) message to the second network device.

Further, after the first UE receives the indication information that is fed back by the second UE and that indicates that the second radio resource reconfiguration message is successfully received, the first UE suspends transmission and reception of data on a radio bearer over the short-distance communication link between the first UE and the second UE.

When the first UE and the second UE are connected over the short-distance link by using a sidelink technology, the first UE suspends processing on an RLC entity on the radio bearer over the short-distance communication link between the first UE and the second UE, and suspends transmission and reception of bottom-layer data.

When the first UE and the second UE are connected over the short-distance link by using a non-3GPP technology, the first UE suspends processing on an adaptation layer on the radio bearer over the short-distance communication link between the first UE and the second UE, and suspends transmission and reception of bottom-layer data.

The following describes processing on a protocol stack when the first UE is being handed over.

When the first UE is handed over from the first network device to the second network device, the first UE needs to reset a media access control (Media Access Control, MAC) layer, and re-establish RLC entities and PDCP entities of radio bearers over all Uu links. In addition, the first UE further needs to process a protocol stack over the short-distance communication link between the first UE and the second UE. Specifically:

for the second type of second UE, the first UE releases a radio bearer over a short-distance link between the first UE and the second UE; and for the first type of second UE, the first UE re-establishes a radio bearer over a short-distance link between the first UE and the second UE.

When the first UE and the second UE are connected over the short-distance link by using a sidelink technology, the first UE re-establishes a radio link control entity corresponding to each second UE over the sidelink. Specific processing includes: discarding all RLC SDUs and/or RLC PDUs buffered on all RLC entity sending sides, discarding all RLC PDUs that have been received on all RLC entity receiving sides, stopping and resetting all timers, and resetting all status variables.

When the first UE and the second UE are connected over the short-distance link by using a non-3GPP technology, the first UE re-establishes an adaptation layer entity corresponding to each second UE over the non-3GPP link. Specific processing includes: clearing an SDU and/or a PDU buffered by the adaptation layer entity, stopping and resetting all timers if existent, and resetting all status variables if existent.

The following describes a processing process after the second UE receives the second radio resource reconfiguration messages.

When the second UE is of the second type, to be specific, when the second UE is no longer connected to the second network device by using the first UE after the first UE is handed over, the second UE is handed over to the second network device or the third network device by using the prior art. The second UE processes a short-distance link connection in two implementations.

In a first implementation, after receiving the second radio resource reconfiguration message, the second UE immediately disconnects the short-distance link between the second UE and the first UE. The second UE may disconnect the short-distance link between the second UE and the first UE by sending a short-distance link connection release message to the first UE.

In a second implementation, after handover of the second UE to the second network device or the third network device is completed, the second UE disconnects the short-distance link between the second UE and the first UE.

When the second UE is of the first type, to be specific, when there is second UE connected to the second network device by using the first UE after the first UE is handed over, the second UE processes a short-distance link connection in two implementations.

In a first implementation, after receiving the second radio resource reconfiguration message, the second UE suspends transmission and reception of the data on the radio bearer over the short-distance communication link between the second UE and the first UE.

After the second UE receives a first message, namely, a short-distance link communication restoration instruction message, sent by the first UE, the second UE re-establishes a radio bearer over the short-distance communication link between the second UE and the first UE, and resumes transmission and reception of data on the radio bearer over the short-distance communication link between the second UE and the first UE.

That the second UE re-establishes a radio bearer over the short-distance communication link between the second UE and the first UE specifically includes:

when the second UE and the first UE are connected over the short-distance link by using a sidelink technology, re-establishing PDCP entities of all radio bearers, re-establishing RLC entities of all the radio bearers, and resetting a MAC entity; or when the second UE and the first UE are connected over the short-distance link by using a non-3GPP technology, re-establishing PDCP entities of all radio bearers.

In a second implementation, after the second UE receives the second radio resource reconfiguration message, the second UE re-establishes a radio bearer over the short-distance communication link between the second UE and the first UE, and suspends transmission and reception of the data on the radio bearer over the short-distance communication link between the second UE and the first UE. After the second UE receives a first message, namely, a short-distance link communication restoration instruction message, sent by the first UE, the second UE resumes transmission and reception of data on the radio bearer over the short-distance communication link between the second UE and the first UE. A manner in which the second UE re-establishes the radio bearer over the short-distance communication link between the second UE and the first UE is the same as a manner used by the first type of second UE in the first implementation, and details are not described herein again.

Step 5100 is performed after step 590.

Step 5100: The first UE sends a short-distance link communication restoration instruction message to the second UE.

The first UE performs the following process:

The first UE sends the short-distance link communication restoration instruction message to the first type of second UE, and the short-distance link communication restoration instruction message is used to instruct the second UE to resume transmission and reception of the data on the radio bearer over the short-distance link between the second UE and the first UE.

When the first UE and the second UE are connected over the short-distance link by using a sidelink technology, the short-distance link communication restoration instruction message is a message generated by a PC5-S protocol layer. When the first UE and the second UE are connected over the short-distance link by using a non-3GPP access technology, the short-distance link communication restoration instruction message is a message generated by a PC5-S protocol layer, a message generated by an adaptation layer, or a message generated by an RRC layer.

The second UE performs the following process:

After receiving the short-distance link communication restoration instruction message, the first type of second UE resumes transmission and reception of the data on the radio bearer over the short-distance link between the second UE and the first UE. For specific processing, refer to processing performed by the second UE after the second UE receives the second radio resource reconfiguration message in step 550*a*/550*b*. Details are not described herein again.

Step 5110: The second UE sends an RRC CRC message to the second network device.

Step 5110*a*: The second type of second UE sends an RRC CRC message to the second network device.

When the third network device exists, the second type of second UE sends the RRC CRC message to the third network device at the same time.

Step 5110*b*: The first type of second UE sends an RRC CRC message to the second network device.

The first type of second UE sends the RRC CRC message to the second network device by using the first UE. When the second UE and the first UE are connected over the short-distance link by using a sidelink technology, a resource used by the first UE to send the RRC CRC message over the sidelink may be added by the second network device to the second radio resource reconfiguration message sent to the second UE.

Figure 9A:
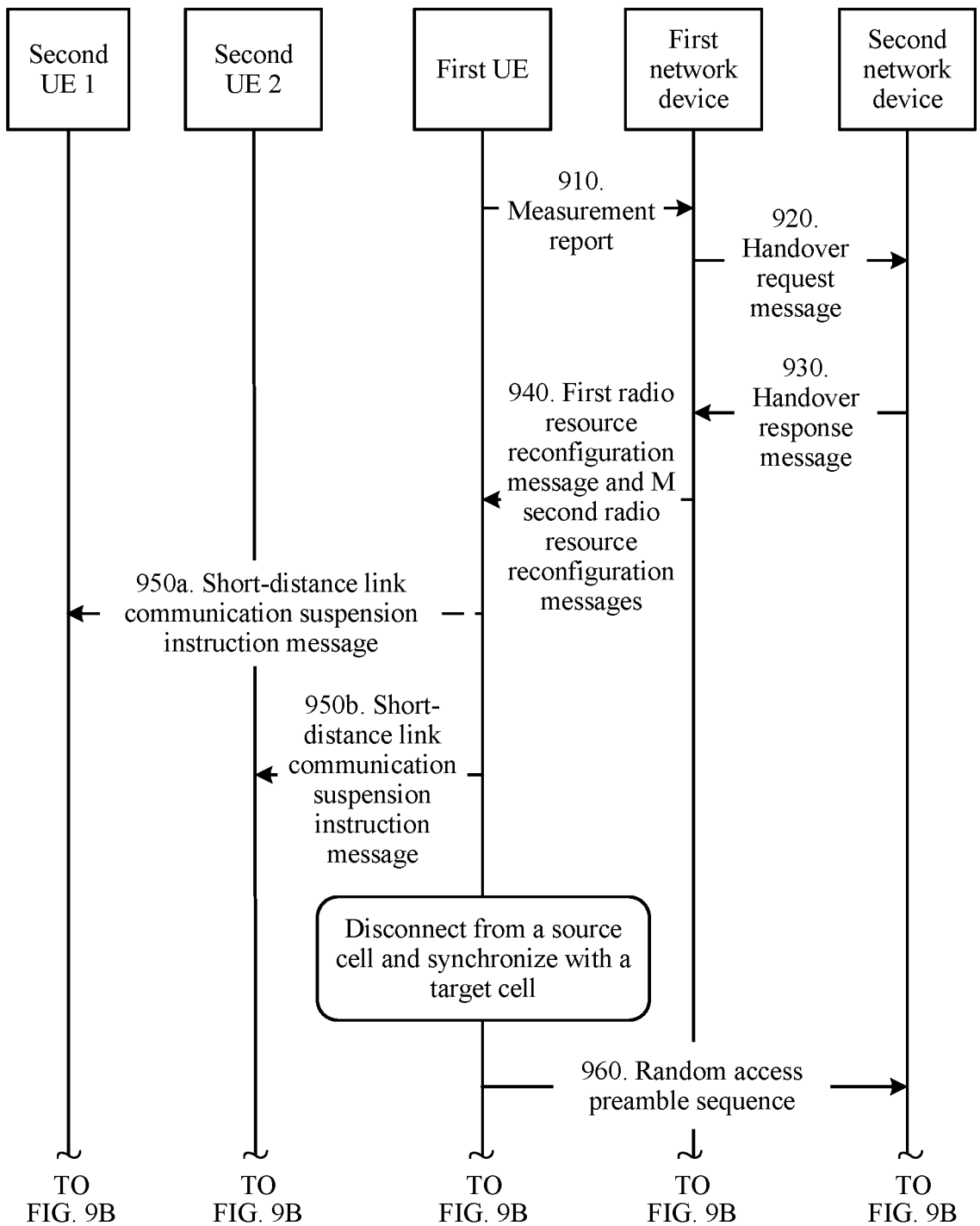
FIG. 9A and FIG. 9B are a diagram of interaction among first UE, second UE, a first network device, and a second network device according to Embodiment 2 of the present invention.
Figure 9B:
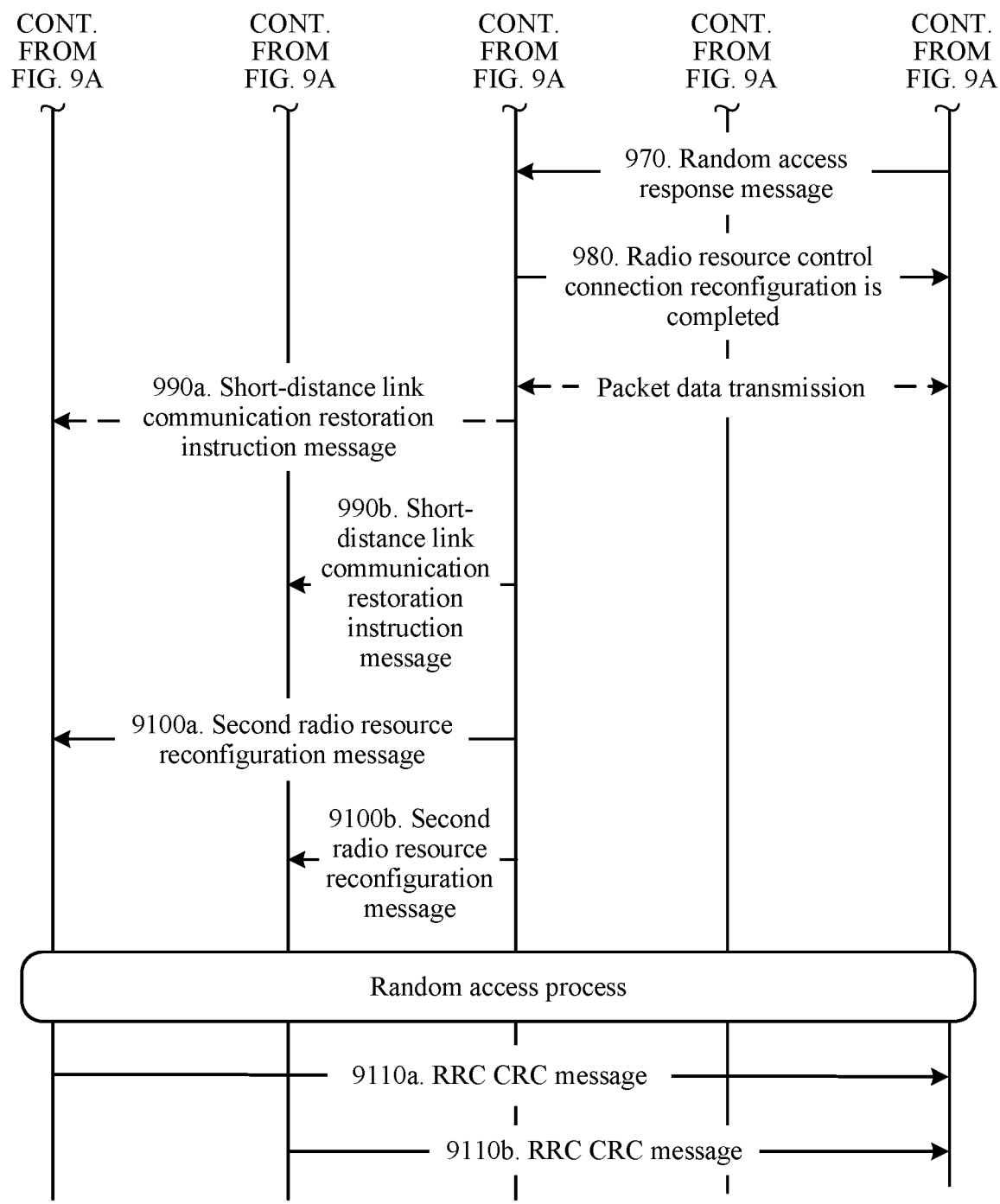

With reference to FIG. 9A and FIG. 9B, the following further describes FIG. 4 by using interaction among the first UE, the second UE, the first network device, and the second network device as an example. FIG. 9A and FIG. 9B are a diagram of interaction among the first UE, the second UE, the first network device, and the second network device according to Embodiment 2 of the present invention. Second UE 1 is the second type of second UE, and second UE 2 is the first type of second UE.

Specific processes of step 910 to step 940 are the same as those of step 510 to step 540, and details are not described herein again.

Step 950: The first UE sends a short-distance link communication suspension instruction message to the second UE.

Step 950*a*: The first UE sends the short-distance link communication suspension instruction message to the second type of second UE.

Step 950*b*: The first UE sends the short-distance link communication suspension instruction message to the first type of second UE.

The first UE performs the following process:

After the first UE receives the radio resource reconfiguration message and the second radio resource reconfiguration messages, regardless of whether the second radio resource reconfiguration message is a radio resource reconfiguration message sent to the first type of second UE or a radio resource reconfiguration message sent to the second type of second UE, the first UE is first handed over from the first network device to the second network device. After the handover is completed, the first UE sends the M second radio resource reconfiguration messages to M second UEs. For the first type of second UE and the second type of second UE, there are specifically the following two optional implementations.

For the first type of second UE, details are as follows:

Implementation 1: The first UE is handed over from the first network device to the first network device. After the handover is completed, the first UE sends a second radio resource reconfiguration message bound for the first type of second UE to the corresponding second UE. Further, the first UE re-establishes a radio bearer over a short-distance link between the first UE and the second UE. The re-establishment operation specifically includes the following steps:

When the first UE and the second UE are connected over the short-distance link by using a sidelink technology, the first UE re-establishes a radio link control entity corresponding to each second UE over the sidelink. Specific processing includes: discarding all RLC SDUs and/or RLC PDUs buffered on all RLC entity sending sides, discarding all RLC PDUs that have been received on all RLC entity receiving sides, stopping and resetting all timers, and resetting all status variables.

When the first UE and the second UE are connected over the short-distance link by using a sidelink technology, the first UE re-establishes an adaptation layer entity corresponding to each second UE over the non-3GPP link. Specific processing includes: clearing an SDU and/or a PDU buffered by the adaptation layer entity, stopping and resetting all timers if existent, and resetting all status variables if existent.

Implementation 2: Before the first UE is handed over from the first network device to the second network device, the first UE sends a second message, namely, the short-distance link communication suspension instruction message to each second UE. The second message is used to instruct the second UE to suspend transmission and reception of data on a radio bearer over a short-distance link between the second UE and the first UE. The first UE also suspends transmission and reception of the data on the radio bearer over the short-distance link between the first UE and the second UE. Then, the first UE is handed over from the first network device to the second network device. After the handover is completed, the first UE sends a third message to each second UE. The third message is used to instruct the second UE to resume transmission and reception of the data on the radio bearer over the short-distance link between the second UE and the first UE. The first UE also suspends transmission and reception of the data on the radio bearer over the short-distance link between the first UE and the second UE. Subsequently, the first UE sends a second radio resource reconfiguration message bound for the first type of second UE to the corresponding second UE. Further, the first UE re-establishes a radio bearer over a short-distance link between the first UE and the second UE. The re-establishment operation is consistent with that in FIG. 5A and FIG. 5B. When the first UE and the second UE are connected over the short-distance link by using a sidelink technology, the short-distance link communication restoration instruction message is a message generated by a PC5-S protocol layer. When the first UE and the second UE are connected over the short-distance link by using a non-3GPP access technology, the short-distance link communication restoration instruction message is a message generated by a PC5-S protocol layer, a message generated by an adaptation layer, or a message generated by an RRC layer.

For the second type of remote UE, details are as follows:

Implementation 1: The first UE is handed over from the first network device to the second network device. After the handover is completed, the first UE sends a second radio resource reconfiguration message bound for the second type of second UE to the corresponding second UE.

Implementation 2: Before the first UE is handed over from the first network device to the second network device, the first UE sends a second message to each second UE. The second message is used to instruct the second UE to suspend transmission and reception of data on a radio bearer over a short-distance link between the second UE and the first UE. The first UE also suspends transmission and reception of the data on the radio bearer over the short-distance link between the first UE and the second UE. Then, the first UE is handed over from the first network device to the second network device. After the handover is completed, the first UE sends a third message to each second UE. The third message is used to instruct the second UE to resume transmission and reception of the data on the radio bearer over the short-distance link between the second UE and the first UE. The first UE also resumes transmission and reception of the data on the radio bearer over the short-distance link between the first UE and the second UE. Subsequently, the first UE sends a second radio resource reconfiguration message bound for the first type of second UE to the corresponding second UE. Then, the first UE releases a short-distance link connection to the second type of second UE. When the first UE and the second UE are connected over the short-distance link by using a sidelink technology, the second message and the third message are messages generated by a PC5-S protocol layer. When the first UE and the second UE are connected over the short-distance link by using a non-3GPP access technology, the second message and the third message are messages generated by a PC5-S protocol layer, messages generated by an adaptation layer, or messages generated by an RRC layer.

For Implementation 2, optionally, after the first UE sends the second radio resource reconfiguration message bound for the first type of second UE to the corresponding second UE, and the first UE receives a short-distance link connection release message sent by the second UE, the first UE releases the short-distance link connection to the second type of second UE.

Correspondingly, the second UE performs the following process:

The first type of second UE:

Implementation 1: In a case in which step 950*a*/950*b* and step 990*a*/990*b* are not included, the second UE receives a second radio resource reconfiguration message sent by the first UE. Further, the second UE re-establishes a radio bearer over a short-distance link between the second UE and the first UE. The re-establishment operation specifically includes the following steps:

The second UE re-establishes transmission and reception of data on the radio bearer over the short-distance communication link between the second UE and the first UE. Specifically, the second UE re-establishes PDCP entities of all radio bearers, re-establishes RLC entities of all the radio bearers, and resets a MAC entity.

When the second UE and the first UE are connected over the short-distance link by using a non-3GPP technology, the PDCP entities of all the radio bearers are re-established.

Implementation 2: The second UE receives a second message sent by the first UE. The second message is used to instruct the second UE to suspend transmission and reception of data on a radio bearer over a short-distance link between the second UE and the first UE. The second UE suspends transmission and reception of the data on the radio bearer over the short-distance link between the second UE and the first UE. Then, the second UE receives a third message sent by the first UE. The third message is used to instruct the second UE to resume transmission and reception of the data on the radio bearer over the short-distance link between the second UE and the first UE. The second UE resumes transmission and reception of the data on the radio bearer over the short-distance link between the second UE and the first UE. Subsequently, the second UE receives a second radio resource reconfiguration message sent by the first UE. Further, the second UE re-establishes a radio bearer over the short-distance link between the second UE and the first UE. The re-establishment operation is the same as that in step 550 and step 560 in FIG. 5A and FIG. 5B, and details are not described herein again. When the first UE and the second UE are connected over the short-distance link by using a sidelink technology, the second message and the third message are messages generated by a PC5-S protocol layer. When the first UE and the second UE are connected over the short-distance link by using a non-3GPP access technology, the second message and the third message are messages generated by a PC5-S protocol layer, messages generated by an adaptation layer, or messages generated by an RRC layer.

The second type of second UE:

Implementation 1: In a case in which step 950a/950b and step 990a/990b are not included, after the second UE receives a second radio resource reconfiguration message forwarded by the first UE, the second UE is handed over to the second network device or the third network device according to the prior art. The second UE processes a short-distance link connection in the following two manners:

Manner 1: After receiving the second radio resource reconfiguration message, the second UE immediately disconnects a short-distance link between the second UE and the first UE. Optionally, the second UE sends a short-distance link connection release message to the first UE.

Manner 2: After handover of the second UE to a target base station is completed, the second UE disconnects a short-distance link between the second UE and the first UE.

Implementation 2: The second UE receives a second message sent by the first UE. The second message is used to instruct the second UE to suspend transmission and reception of data on a radio bearer over a short-distance link between the second UE and the first UE. The second UE suspends transmission and reception of the data on the radio bearer over the short-distance link between the second UE and the first UE. Then, the second UE receives a third message sent by the first UE. The third message is used to instruct the second UE to resume transmission and reception of the data on the radio bearer over the short-distance link between the second UE and the first UE. The second UE resumes transmission and reception of the data on the radio bearer over the short-distance link between the second UE and the first UE. After the second UE receives a second radio resource reconfiguration message sent by the first UE, an operation performed by the second UE is the same as that in step 550 and step 560 in FIG. 5A and FIG. 5B, and details are not described herein again. When the first UE and the second UE are connected over the short-distance link by using a sidelink technology, the second message and the third message are messages generated by a PC5-S protocol layer. When the first UE and the second UE are connected over the short-distance link by using a non-3GPP access technology, the second message and the third message are messages generated by a PC5-S protocol layer, messages generated by an adaptation layer, or messages generated by an RRC layer.

Specific processes of step 960 to step 980 are the same as those of step 570 to step 590, and details are not described herein again.

Step 990: The first UE sends a short-distance link communication restoration instruction message to the second UE.

Step 990a: The first UE sends the short-distance link communication restoration instruction message to the second type of second UE.

Step 990b: The first UE sends the short-distance link communication restoration instruction message to the first type of second UE.

A processing process on a first UE side is as follows:

After handover of the first UE is completed, in other words, after an RRC CRC is sent to the second UE, the first UE sends the third message, namely, the short-distance link communication restoration instruction message, to the second UE. For specific processing by the first UE, refer to description in Implementation 2 in step 950a/950b.

A processing process on a second UE side is as follows:

After receiving the short-distance link communication restoration instruction message sent by the first UE, the second UE resumes transmission and reception of the data on the radio bearer over the short-distance link between the second UE and the second UE. For specific processing, refer to description in Implementation 2 in step 950a/950b.

Step 9100: The first UE sends the second radio resource control reconfiguration message to the second UE.

9100a. The first UE sends a second radio resource control reconfiguration message to the second type of second UE.

9100b. The first UE sends a second radio resource control reconfiguration message to the first type of second UE.

The first UE performs the following processing process:

The first UE sends the second radio resource reconfiguration message to second UE. For specific processing by the second UE, refer to step 550a and step 550b. Details are not described herein again.

The second UE performs the following processing process:

The second UE receives the second radio resource reconfiguration message sent by the first UE. For specific processing by the second UE, refer to description in the two implementations in step 550a/550b.

Step 9110: The second UE sends an RRC CRC message to the second network device.

Step 9110a: The second type of second UE sends an RRC CRC message to the second network device.

Step 9110b: The first type of second UE sends an RRC CRC message to the second network device.

The first type of second UE sends the RRC CRC message to the second network device by using the first UE. When the second UE and the first UE are connected over the short-distance link by using a sidelink technology, a resource used by the second UE to send the RRC CRC message over the sidelink may be added by the second network device to the second radio resource reconfiguration message sent to the second UE.

The second type of second UE sends the RRC CRC message to the second network device or the third network device.

After the first UE receives the first radio resource reconfiguration message and the second radio resource reconfiguration messages, if there is both the first type of second UE and the second type of first UE, for the first type of second UE, the first UE performs operations in a manner in FIG. 5A and FIG. 5B, and for the second type of second UE, the first UE performs operations in a manner in FIG. 9A and FIG. 9B.

Figure 10A:
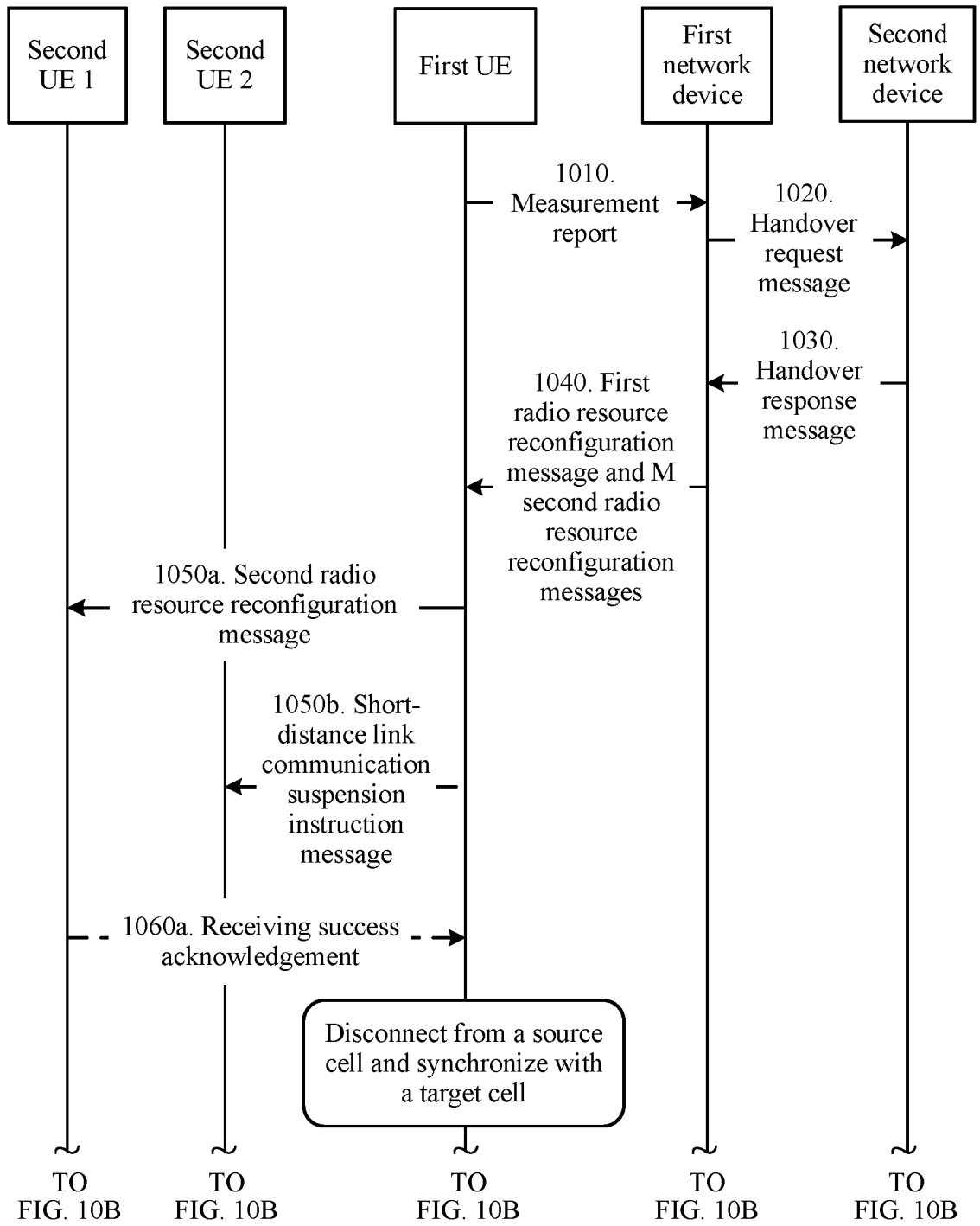
FIG. 10A and FIG. 10B are a diagram of interaction among first UE, second UE, a first network device, and a second network device according to Embodiment 3 of the present invention.
Figure 10B:
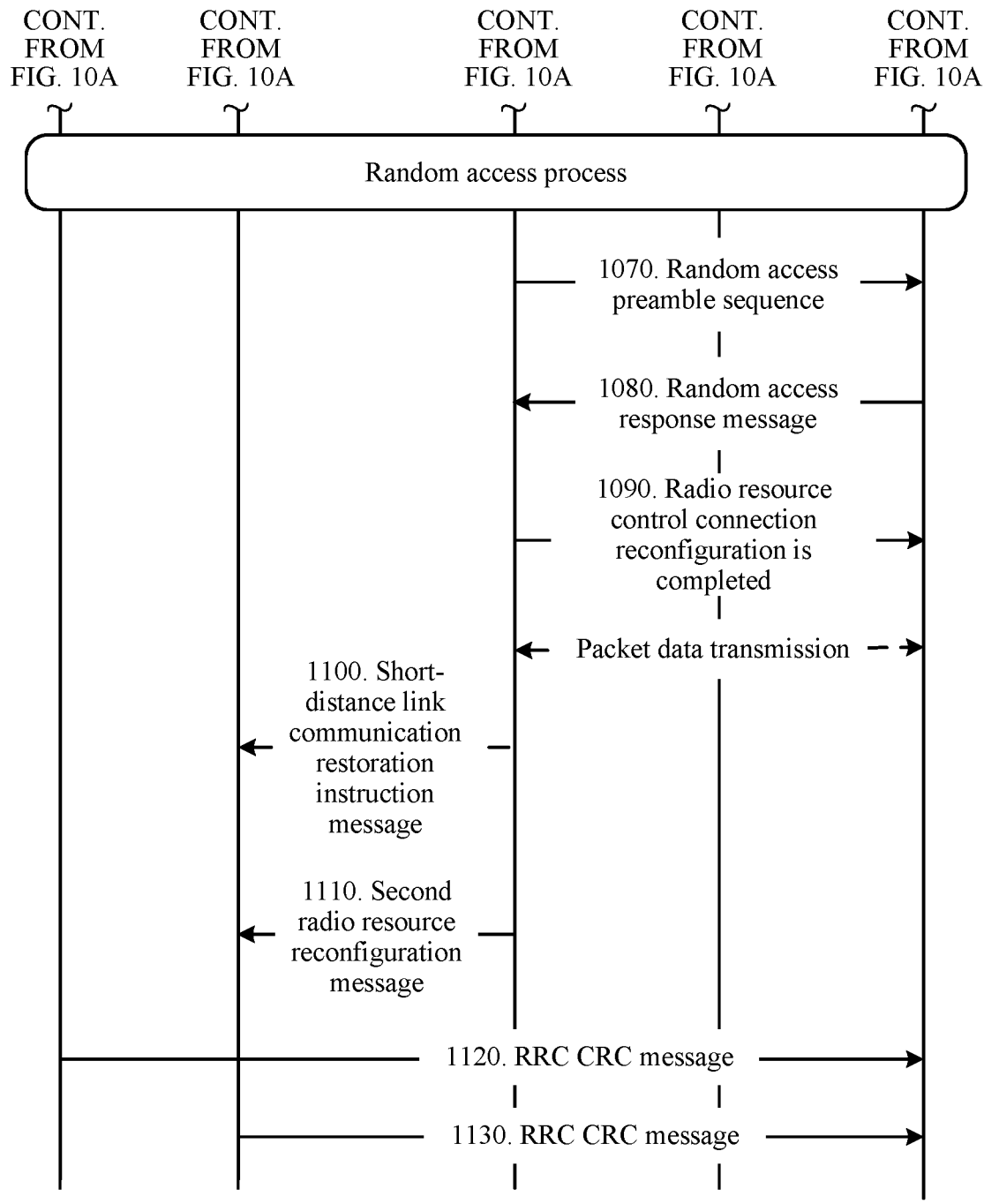

With reference to FIG. 10A and FIG. 10B, the following further describes FIG. 4 by using interaction among the first UE, the second UE, the first network device, and the second network device as an example. FIG. 9A and FIG. 9B are a diagram of interaction among the first UE, the second UE, the first network device, and the second network device according to Embodiment 2 of the present invention. Second UE 1 is the second type of second UE, and second UE 2 is the first type of second UE.

Step 1010 and step 1040 have same implementations as step 510 to step 540, and details are not described herein again.

Step 1050a: The first UE sends a second radio resource reconfiguration message to the second type of second UE.

Step 1050b: The first UE sends a short-distance link communication suspension instruction message to the first type of second UE.

Step 1070 to step 1090 have same implementations as step 970 and step 990, and details are not described herein again.

Step 1100: The first UE sends short-distance link communication restoration instruction information to the first type of second UE.

Step 1110: The first UE sends a second radio resource reconfiguration message to the first type of second UE.

Step 1120: The second type of second UE sends an RRC CRC message to the second network device.

Step 1130: The first type of second UE sends an RRC CRC message to the second network device.

Through application of the handover method provided in this embodiment of the present invention, the first UE receives the first radio resource reconfiguration message and the M second radio resource reconfiguration messages, where the first radio resource reconfiguration message and the M second radio resource reconfiguration messages are sent by the first network device. The first radio resource reconfiguration message includes the first handover command, the first handover command is used to instruct to hand over the first UE from the first network device to the second network device, the second radio resource reconfiguration message includes the second handover command, the second handover command is used to instruct to hand over the second UE from the first network device to the third network device, M is the quantity of second UEs in the RRC connected mode that are connected to the first UE, M is an integer greater than or equal to 1, and the second network device is the same as or different from the third network device. The first UE is handed over from the first network device to the second network device according to the first handover command. This resolves a problem of high signaling overheads and high power consumption when evolved remote UE and evolved relay UE are handed over from the first network device to the second network device at the same time.

Figure 11:
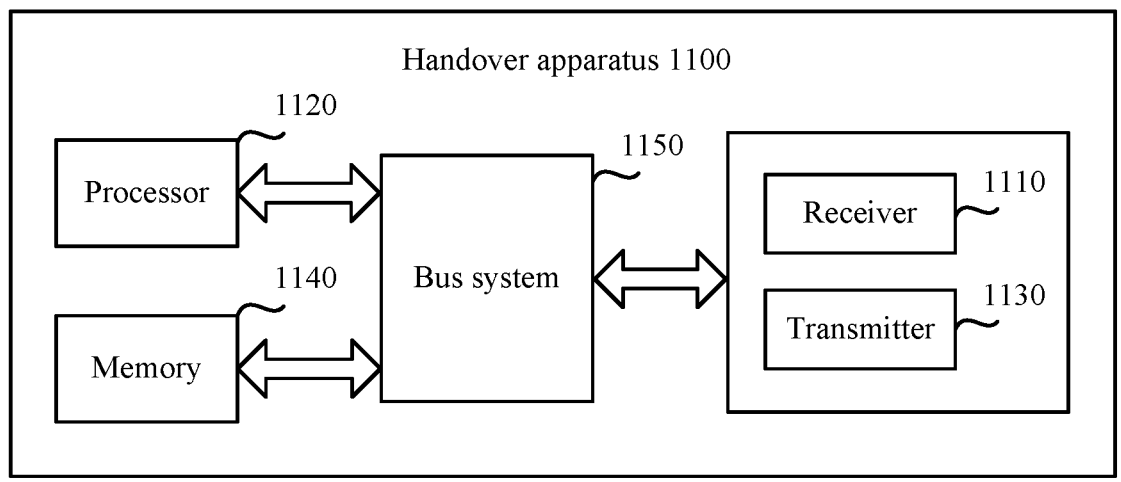
FIG. 11 is a schematic diagram of a handover apparatus according to Embodiment 4 of the present invention.

FIG. 11 is a schematic diagram of a handover apparatus according to Embodiment 4 of the present invention. The handover apparatus 1100 is configured to perform a method procedure performed by the first UE. As shown in FIG. 11, the handover apparatus 1100 includes a receiver 1110, a processor 1120, a transmitter 1130, a memory 1140, and a bus system 1150.

The memory 1140 is configured to store a program. Only one memory is shown in FIG. 11. Certainly, a plurality of memories may be disposed as required. The memory 1140 may be a memory in the processor 1120.

The memory 1140 stores the following elements: an executable module or a data structure, a subset thereof, or an extended set thereof; operation instructions, including various operation instructions and used to implement various operations; and operating systems, including various system programs and configured to implement various basic services and process hardware-based tasks.

The processor 1120 controls operations of the handover apparatus 1100, and the processor 1120 may also be referred to as a CPU. In specific application, all components of the handover apparatus 1100 are coupled together by using the bus system 1150. The bus system 1150 may include a power supply bus, a control bus, a status signal bus, and the like in addition to a data bus. However, for clear description, various types of buses in the figure are marked as the bus system 1150. For ease of illustration, FIG. 11 shows merely an example of the bus system 1150.

The method disclosed in the foregoing embodiments of this application may be applied to the processor 1120, or may be implemented by the processor 1120. The processor 1120 may be an integrated circuit chip and has a signal processing capability. In an implementation process, steps in the foregoing method may be implemented by using a hardware integrated logical circuit in the processor 1120, or by using instructions in a form of software. The processor 1120 may be a general-purpose processor, a DSP, an ASIC, an FPGA or another programmable logic device, a discrete gate or transistor logic device, or a discrete hardware component. The processor 1120 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by using a combination of hardware and software modules in the decoding processor. A software module may be located in a mature storage medium in the aft, such as a random access memory, a flash memory, a read-only memory, a programmable read-only memory, an electrically erasable programmable memory, a register, or the like. The storage medium is located in the memory 1140. The processor 1120 reads information from the memory 1140, and performs the following steps in combination with hardware of the processor 1120.

The receiver 1110 is configured to receive a first radio resource reconfiguration message and M second radio resource reconfiguration messages, where the first radio resource reconfiguration message and the M second radio resource reconfiguration messages are sent by a first network device, the first radio resource reconfiguration message includes a first handover command, the first handover command is used to instruct to hand over the handover apparatus 1100 from the first network device to a second network device, the second radio resource reconfiguration message includes a second handover command, the second handover command is used to instruct to hand over second UE from the first network device to a third network device, M is a quantity of second UEs in an RRC connected mode that are connected to the handover apparatus 1100, and the second network device is the same as or different from the third network device.

The processor 1120 is configured to hand over the handover apparatus 1100 from the first network device to the second network device according to the first handover command.

Further, the first radio resource reconfiguration message includes first information, and the first information includes at least one of first indication information and second indication information. The first indication information is used to indicate second UE connected to the second network device by using the handover apparatus 1100 after the handover apparatus 1100 is handed over to the second network device, a quantity of second UEs connected to the second network device by using the handover apparatus 1100 is X, and X is an integer that is not greater than M. The second indication information is used to indicate second UE that is connected to the second network device not by using the handover apparatus 1100 after the handover apparatus 1100 is handed over to the second network device, and a quantity of second UEs that are connected to the second network device not by using the handover apparatus 1100 is M-X.

Further, the first indication information or the second indication information is specifically a device identifier of the second UE.

Further, the first radio resource reconfiguration message includes second information, and the second information includes a configuration of a resource or a resource pool used to send the second radio resource configuration message over a sidelink.

Further, the first radio resource reconfiguration message is included in a first RLC SDU, the second radio resource reconfiguration messages are included in second RLC SDUs, and the first RLC SDU and at least one of the M second RLC SDUs are included in one RLC PDU.

Further, the transmitter 1130 is configured to send the second radio resource reconfiguration message to the second UE.

The processor 1120 is further configured to hand over the handover apparatus 1100 from the first network device to the second network device after sending the M second radio resource reconfiguration messages is completed.

Further, the transmitter 1130 is configured to send the second radio resource reconfiguration message to the second UE.

The receiver 1110 is further configured to receive indication information that is fed back by the second UE and that indicates that the second radio resource reconfiguration message is successfully received.

The processor 1120 is further configured to hand over the handover apparatus 1100 from the first network device to the second network device after the handover apparatus 1100 receives M pieces of indication information.

Further, the processor 1120 is configured to suspend transmission and reception of data on a radio bearer over a link between the handover apparatus 1100 and the second UE.

Further, the processor 1120 is configured to: when handing over the handover apparatus 1100 from the first network device to the second network device according to the first handover command, if there is second UE connected to the second network device by using the handover apparatus 1100, re-establish a radio bearer over a link between the handover apparatus 1100 and the second UE.

Further, the processor 1120 is configured to: when handing over the handover apparatus 1100 from the first network device to the second network device according to the first handover command, if there is no second UE connected to the second network device by using the handover apparatus 1100, release the radio bearer over the link between the handover apparatus 1100 and the second UE.

Further, the processor 1120 is configured to: if there is the second UE connected to the second network device by using the handover apparatus 1100, resume transmission and reception of data on the radio bearer over the link between the handover apparatus 1100 and the second UE.

Further, the transmitter 1130 is configured to send a first message to the second UE, where the first message is used to instruct the second UE to resume transmission and reception of the data on the radio bearer over the link between the second UE and the handover apparatus 1100.

Further, the transmitter 1130 is configured to: if there is no second UE connected to the second network device by using the handover apparatus 1100, send the second radio resource reconfiguration message to the second UE.

Further, the transmitter 1130 is configured to: if there is no second UE connected to the second network device by using the handover apparatus 1100, send a second message to the second UE before the handover apparatus 1100 is handed over from the first network device to the second network device, where the second message is used to instruct the second UE to suspend transmission and reception of data on a radio bearer over a link between the second UE and the handover apparatus 1100.

The processor 1120 is further configured to suspend transmission and reception of the data on the radio bearer over the link between the handover apparatus 1100 and the second UE.

The transmitter 1130 is further configured to send the second message to the second UE after the handover apparatus 1100 is handed over from the first network device to the second network device, where the second message is used to instruct the second UE to resume transmission and reception of the data on the radio bearer over the link between the second UE and the handover apparatus 1100.

The processor 1120 is further configured to resume transmission and reception of the data on the radio bearer over the link between the handover apparatus 1100 and the handover apparatus 1100.

The transmitter 1130 is further configured to send the second radio resource reconfiguration message to the second UE.

Further, the processor 1120 is configured to: if there is no second UE connected to the second network device by using the handover apparatus 1100, release a connection of the link between the handover apparatus 1100 and the second UE.

Further, the transmitter 1130 is configured to: if there is second UE connected to the second network device by using the handover apparatus 1100, send the second radio resource reconfiguration message to the second UE.

The processor 1120 is further configured to re-establish a radio bearer over a link between the handover apparatus 1100 and the second UE.

Further, the transmitter 1130 is configured to: if there is second UE connected to the second network device by using the handover apparatus 1100, send a second message to the second UE before the handover apparatus 1100 is handed over from the first network device to the second network device, where the second message is used to instruct the second UE to suspend transmission and reception of data on a radio bearer over a link between the second UE and the handover apparatus 1100.

The processor 1120 is further configured to suspend transmission and reception of the data on the radio bearer over the link between the handover apparatus 1100 and the second UE.

The transmitter 1130 is further configured to send a third message to the second UE after the handover apparatus 1100 is handed over from the first network device to the second network device, where the third message is used to instruct the second UE to resume transmission and reception of the data on the radio bearer over the link between the second UE and the handover apparatus 1100.

The processor 1120 is further configured to resume transmission and reception of the data on the radio bearer over the link between the handover apparatus 1100 and the handover apparatus 1100.

The transmitter 1130 is further configured to send the second radio resource reconfiguration message to the second UE.

The processor 1150 is further configured to re-establish a radio bearer over the link between the handover apparatus 1100 and the second UE.

Through application of the handover apparatus 1100 provided in this embodiment of the present invention, the receiving unit receiver 1110 receives the first radio resource reconfiguration message and the M second radio resource reconfiguration messages, where the first radio resource reconfiguration message and the M second radio resource reconfiguration messages are sent by the first network device. The first radio resource reconfiguration message includes the first handover command, the first handover command is used to instruct to hand over the handover apparatus 1100 from the first network device to the second network device, the second radio resource reconfiguration message includes the second handover command, the second handover command is used to instruct to hand over the second UE from the first network device to the third network device, M is the quantity of second UEs in the RRC connected mode that are connected to the handover apparatus 1100, M is an integer greater than or equal to 1, and the second network device is the same as or different from the third network device. The handover unit processor 1120 hands over the handover apparatus 1100 from the first network device to the second network device according to the first handover command. This resolves a problem of high signaling overheads and high power consumption when the first UE and the second UE are handed over.

The method steps in the embodiments of this application may be implemented in a hardware form, or may be implemented by a processor by executing a software instruction. The software instruction may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a sending device or a receiving device. Certainly, the processor and the storage medium may exist in the sending device or the receiving device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from one website, computer, server, or data center to another website, computer, server, or data center in a wired (for example, a coaxial cable, a fiber, or a digital subscriber line (DSL)) or wireless (for example, infrared, wireless, or a microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

It may be understood that various numerical symbols related to the embodiments of this application are differentiated merely for ease of description, but are not used to limit the scope of the embodiments of this application.

It may be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The foregoing descriptions are merely specific implementations of the embodiments of this application. Any variation or replacement readily figured out by a person skilled in the art within the technical scope disclosed in this application shall fall within the protection scope of the embodiments of this application.

What is claimed is:

1. A method, comprising:
receiving, by first user equipment (UE) from a first network device, a first radio resource reconfiguration message and M second radio resource reconfiguration messages, wherein the first radio resource reconfiguration message comprises a first handover command, the first handover command instructs the first UE to hand over from the first network device to a second network device, each second radio resource reconfiguration message of the M second radio resource reconfiguration messages comprises a respective second handover command, each second handover command instructs a respective second UE corresponding to the respective second handover command to hand over from the first network device to a third network device, M is a quantity of second UEs in a radio resource control (RRC) connected mode that are connected to the first UE, M is an integer greater than or equal to 1, and the second network device is the same as or different from the third network device; and
handing over, by the first UE, from the first network device to the second network device according to the first handover command;
wherein:
the first radio resource reconfiguration message is comprised in a first radio link control service data unit (RLC SDU);
the M second radio resource reconfiguration messages are comprised in M second RLC SDUs; and
the first RLC SDU and at least one of the M second RLC SDUs are comprised in one radio link control protocol data unit (RLC PDU).

2. The method according to claim 1, wherein:
the first radio resource reconfiguration message comprises first information, and the first information comprises first indication information or second indication information;

the first indication information indicates a third UE that is connected to the second network device using the first UE after the first UE is handed over to the second network device; and the second indication information indicates a fourth UE that is connected to the second network device in a manner other than by using the first UE after the first UE is handed over to the second network device.

3. The method according to claim 2, wherein the first indication information is a device identifier of the third UE, or the second indication information is a device identifier of the fourth UE.

4. The method according to claim 1, wherein the first radio resource reconfiguration message comprises second information, and the second information comprises a configuration of a resource or a resource pool used to send the M second radio resource reconfiguration messages over a sidelink.

5. The method according to claim 1, wherein before handing over, by the first UE, from the first network device to the second network device according to the first handover command, the method further comprises:
sending, by the first UE, the M second radio resource reconfiguration messages to the second UEs; and
wherein handing over, by the first UE, from the first network device to the second network device according to the first handover command comprises:
handing over, by the first UE, from the first network device to the second network device after the first UE completes sending the M second radio resource reconfiguration messages.

6. The method according to claim 5, wherein before handing over, by the first UE, from the first network device to the second network device according to the first handover command, the method further comprises:
receiving, by the first UE, M pieces of indication information that are fed back by the second UEs, wherein each piece of indication information of the M pieces of indication information indicates that a corresponding second radio resource reconfiguration message is successfully received by the respective second UE from which the respective piece of indication information is received; and
wherein handing over, by the first UE, from the first network device to the second network device according to the first handover command comprises:
handing over, by the first UE, from the first network device to the second network device after the first UE receives the M pieces of indication information.

7. The method according to claim 6, wherein after sending, by the first UE, the M second radio resource reconfiguration messages to the second UEs, or after the receiving, by the first UE, the M pieces of indication information that are fed back by the second UEs, the method further comprises:
suspending, by the first UE, transmission and reception of data on a radio bearer over a link between the first UE and a first second UE of the second UEs.

8. The method according to claim 5, further comprising:
when handing over, by the first UE, from the first network device to the second network device according to the first handover command, and when a first second UE is connected to the second network device using the first UE, re-establishing, by the first UE, a radio bearer over a link between the first UE and the first second UE.

9. The method according to claim 8, further comprising:
after handing over, by the first UE, from the first network device to the second network device according to the first handover command, and when there is no second UE connected to the second network device using the first UE, releasing, by the first UE, the radio bearer over the link between the first UE and the first second UE of the second UEs.

10. The method according to claim 8, wherein after handing over, by the first UE, from the first network device to the second network device according to the first handover command, the method further comprises:
when the first second UE is connected to the second network device using the first UE, resuming, by the first UE, transmission and reception of data on the radio bearer over the link between the first UE and the first second UE; and
sending, by the first UE, a first message to the first second UE, wherein the first message instructs the first second UE to resume transmission and reception of the data on the radio bearer over the link between the first second UE and the first UE.

11. The method according to claim 1, wherein after handing over, by the first UE, from the first network device to the second network device, the method further comprises:
when there is no second UE connected to the second network device using the first UE, sending, by the first UE, the M second radio resource reconfiguration messages to the second UEs.

12. The method according to claim 1, further comprising:
before the first UE is handed over from the first network device to the second network device, and when there is no second UE connected to the second network device using the first UE, sending, by the first UE, a second message to a first second UE of the second UEs, wherein the second message instructs the first second UE to suspend transmission and reception of data on a radio bearer over a link between the first second UE and the first UE;
suspending, by the first UE, transmission and reception of the data on the radio bearer over the link between the first UE and the first second UE;
sending, by the first UE, the second message to the first second UE after the first UE is handed over from the first network device to the second network device, wherein the second message instructs the first second UE to resume transmission and reception of the data on the radio bearer over the link between the first second UE and the first UE;
resuming, by the first UE, transmission and reception of the data on the radio bearer over the link between the first UE and the first second UE; and
sending, by the first UE, the second radio resource reconfiguration message to the first second UE.

13. The method according to claim 1, wherein after sending, by the first UE, the M second radio resource reconfiguration messages to the second UEs, the method further comprises:
when there is no second UE connected to the second network device using the first UE, releasing, by the first UE, a connection of the link between the first UE and a first second UE of the second UEs.

14. The method according to claim 1, wherein after handing over, by the first UE, from the first network device to the second network device, the method further comprises:
when there is second UE connected to the second network device using the first UE, sending, by the first UE, the M second radio resource reconfiguration messages to the second UEs; and re-establishing, by the first UE, a radio bearer over a link between the first UE and a first second UE of the second UEs.

15. The method according to claim 1, further comprising:
before the first UE is handed over from the first network device to the second network device, and when there is second UE connected to the second network device using the first UE, sending, by the first UE, a second message to a first second UE of the second UEs, wherein the second message instructs the first second UE to suspend transmission and reception of data on a radio bearer over a link between the first second UE and the first UE;
suspending, by the first UE, transmission and reception of the data on the radio bearer over the link between the first UE and the first second UE;
sending, by the first UE, a third message to the first second UE after the first UE is handed over from the first network device to the second network device, wherein the third message instructs the first second UE to resume transmission and reception of the data on the radio bearer over the link between the first second UE and the first UE;
resuming, by the first UE, transmission and reception of the data on the radio bearer over the link between the first UE and the first second UE;
sending, by the first UE, the second radio resource reconfiguration message to the first second UE; and
re-establishing, by the first UE, a radio bearer over the link between the first UE and the first second UE.

16. An apparatus, comprising:
a receiver, configured to:
 receive a first radio resource reconfiguration message and M second radio resource reconfiguration messages, wherein the first radio resource reconfiguration message and the M second radio resource reconfiguration messages are sent by a first network device, the first radio resource reconfiguration message comprises a first handover command, the first handover command instructs to hand over the apparatus from the first network device to a second network device, the M second radio resource reconfiguration messages each comprise a second handover command, each second handover command instructs respective second UE corresponding to the respective second handover command to hand over from the first network device to a third network device, M is a quantity of second UEs in an RRC connected mode that are connected to the apparatus, M is an integer greater than or equal to 1, and the second network device is the same as or different from the third network device; and
a processor; and
a non-transitory computer-readable storage medium storing a program to be executed by the processor, the program including instructions for:
 handing over the apparatus from the first network device to the second network device according to the first handover command;
wherein:
 the first radio resource reconfiguration message is comprised in a first radio link control service data unit (RLC SDU);
 the M second radio resource reconfiguration messages are comprised in M second RLC SDUs; and
 the first RLC SDU and at least one of the M second RLC SDUs are comprised in one radio link control protocol data unit (RLC PDU).

17. The apparatus according to claim 16, wherein:
the first radio resource reconfiguration message comprises first information, and the first information comprises first indication information or second indication information, wherein
the first indication information indicates second UE of the second UEs that is connected to the second network device using the apparatus after the apparatus is handed over to the second network device, wherein a quantity of second UEs connected to the second network device using the apparatus is X, and X is an integer that is not greater than M; and
the second indication information indicates second UE of the second UEs that is connected to the second network device in a manner other than by using the apparatus after the apparatus is handed over to the second network device, and a quantity of second UEs that are connected to the second network device in the manner other than by using the apparatus is M-X; and
the first indication information or the second indication information is a device identifier of the indicated second UE of the second UEs.

18. The apparatus according to claim 16, further comprising:
a transmitter, configured to send the M second radio resource reconfiguration messages to the second UEs; and
wherein the instructions for handing over the apparatus from the first network device to the second network device comprise instructions for handing over the apparatus from the first network device to the second network device after sending the M second radio resource reconfiguration messages.

19. The apparatus according to claim 16, wherein the first radio resource reconfiguration message comprises second information, and the second information comprises a configuration of a resource or a resource pool used to send the M second radio resource reconfiguration messages over a sidelink.

20. A method, comprising:
receiving, by first user equipment (UE) from a first network device, a first radio resource reconfiguration message and M second radio resource reconfiguration messages, wherein the first radio resource reconfiguration message comprises a first handover command, the first handover command instructs the first UE to hand over from the first network device to a second network device, each second radio resource reconfiguration message of the M second radio resource reconfiguration messages comprises a respective second handover command, each second handover command instructs a respective second UE corresponding to the respective second handover command to hand over from the first network device to a third network device, M is a quantity of second UEs in a radio resource control (RRC) connected mode that are connected to the first UE, M is an integer greater than or equal to 1, and the second network device is the same as or different from the third network device; and
handing over, by the first UE, from the first network device to the second network device according to the first handover command;

wherein after handing over, by the first UE, from the first network device to the second network device, the method further comprises:
when there is no second UE connected to the second network device using the first UE, sending, by the first UE, the M second radio resource reconfiguration messages to the second UEs.

* * * * *